Aug. 6, 1963 W. E. BRAINARD ETAL 3,099,873
SHUTTLE OPERATED TAPE CONTROLLED MACHINE TOOL
Filed Nov. 28, 1958 6 Sheets-Sheet 1
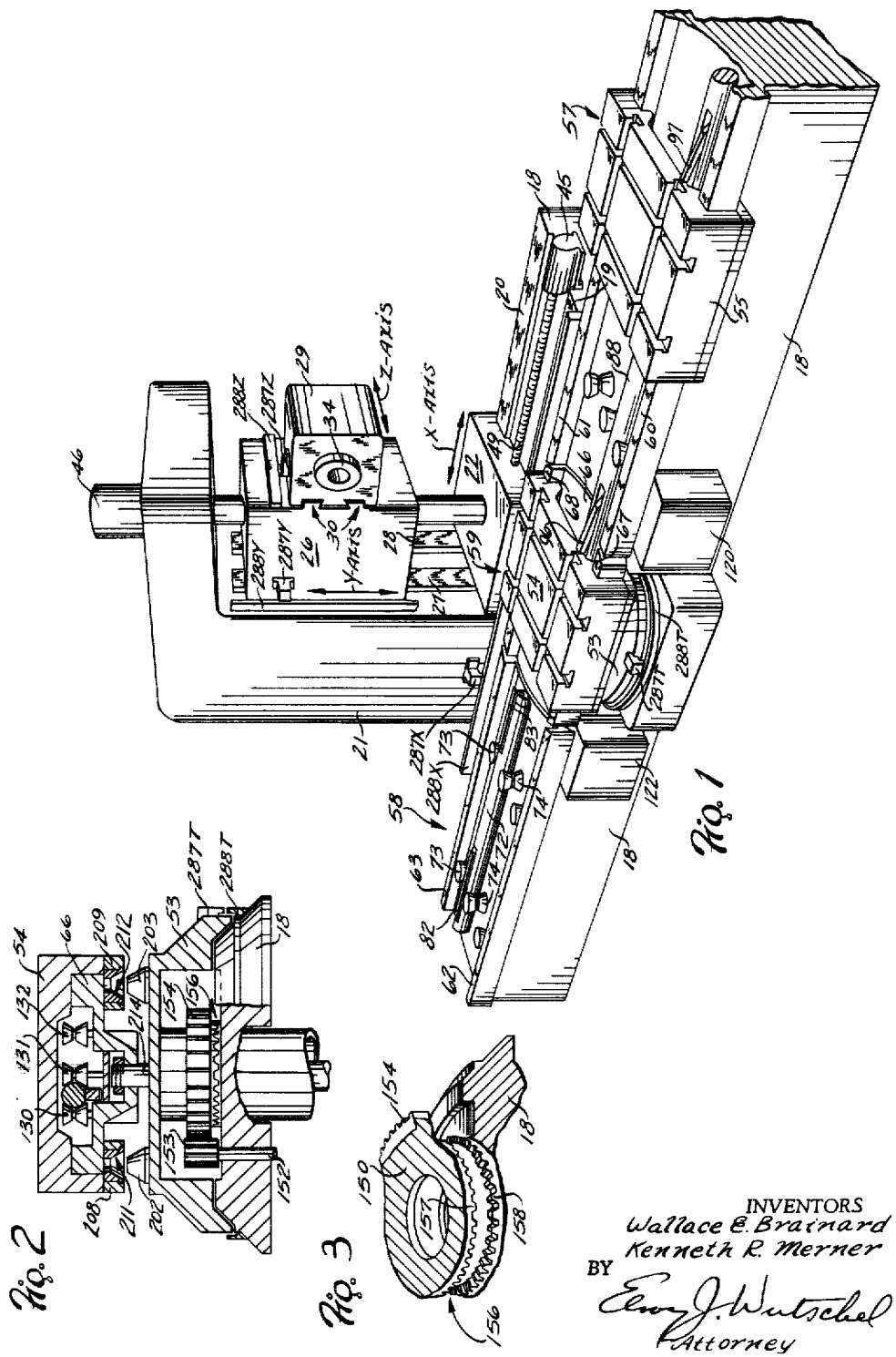
INVENTORS
Wallace E. Brainard
Kenneth R. Merner
BY
Elmer J. Wutschel
Attorney

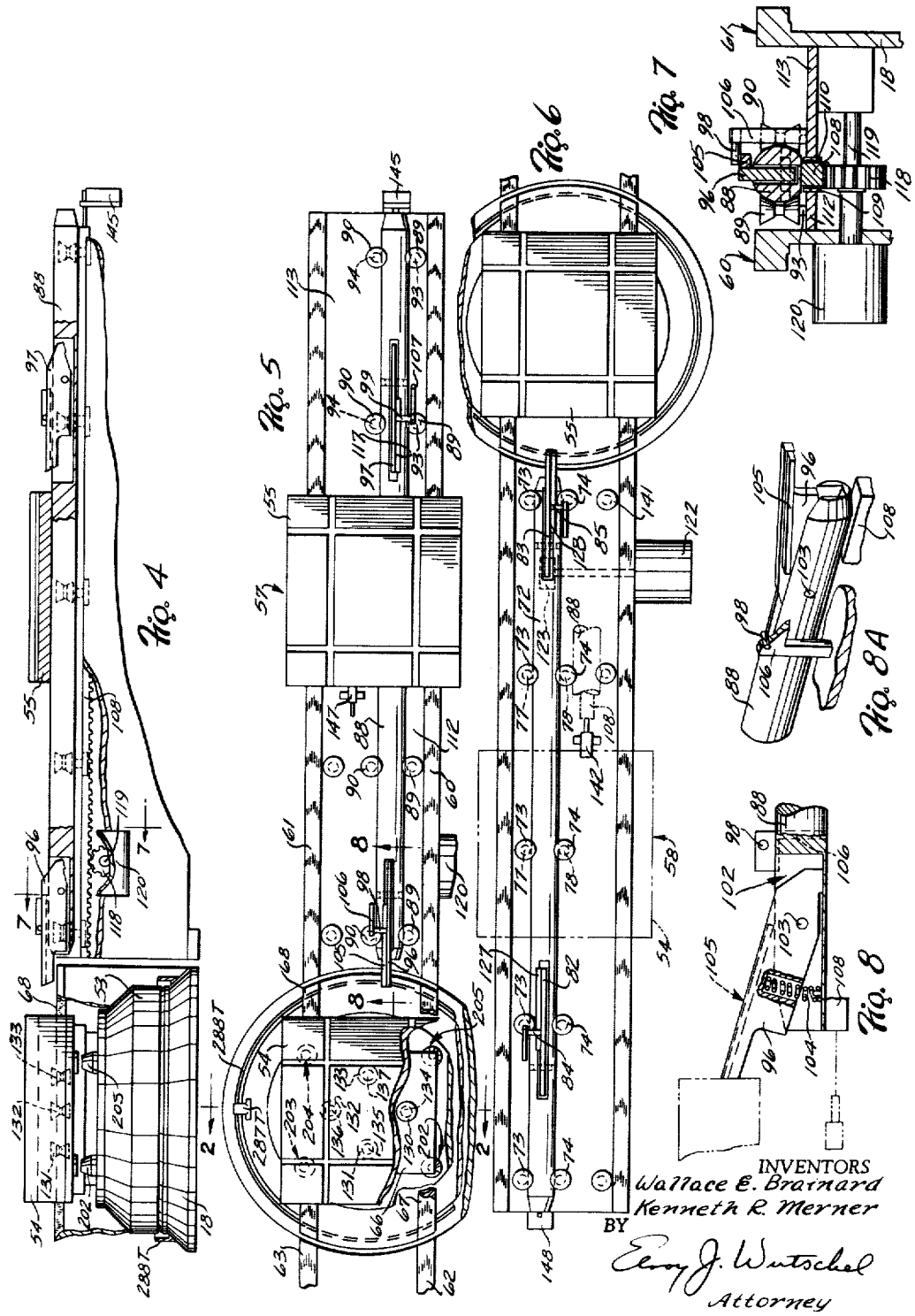

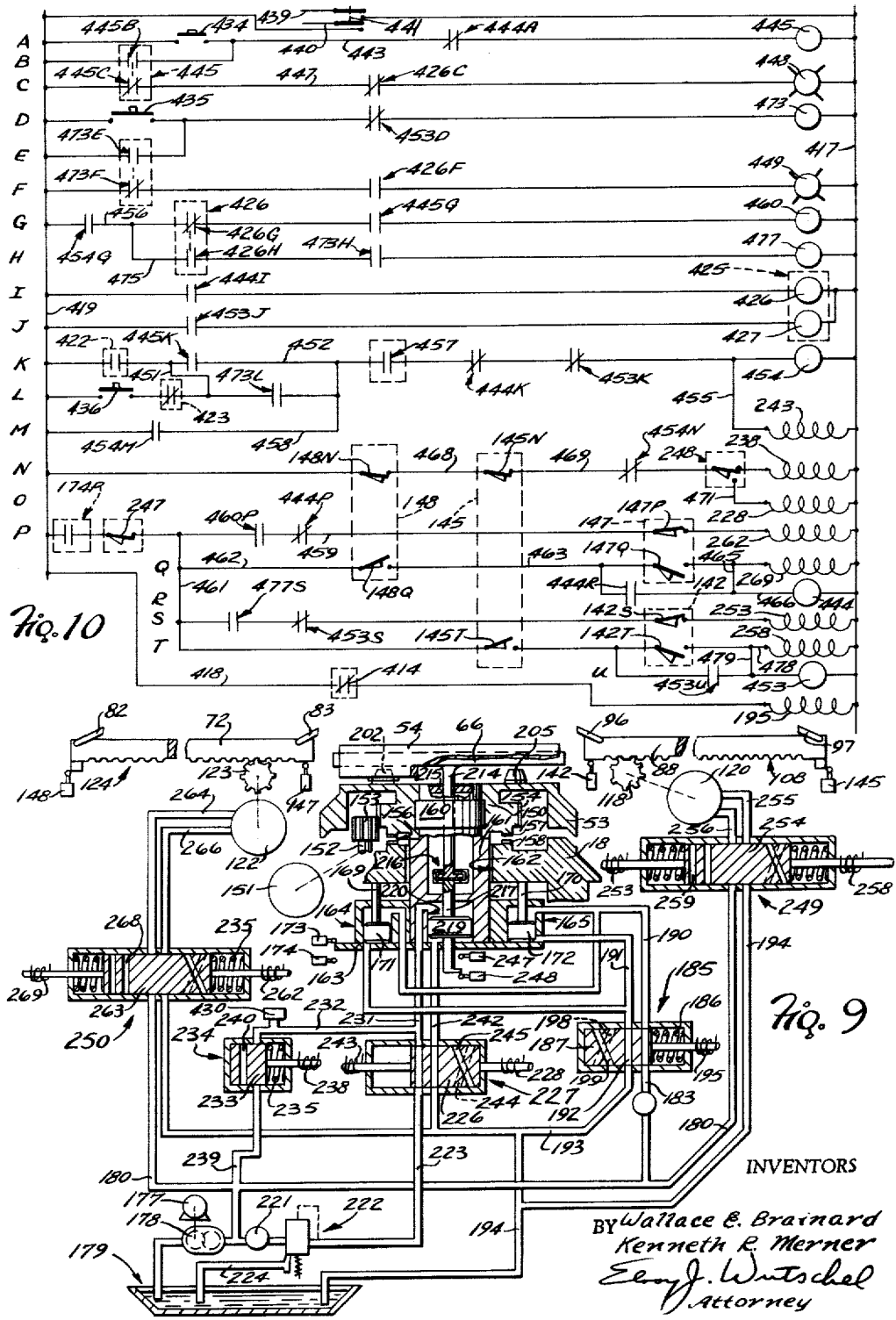

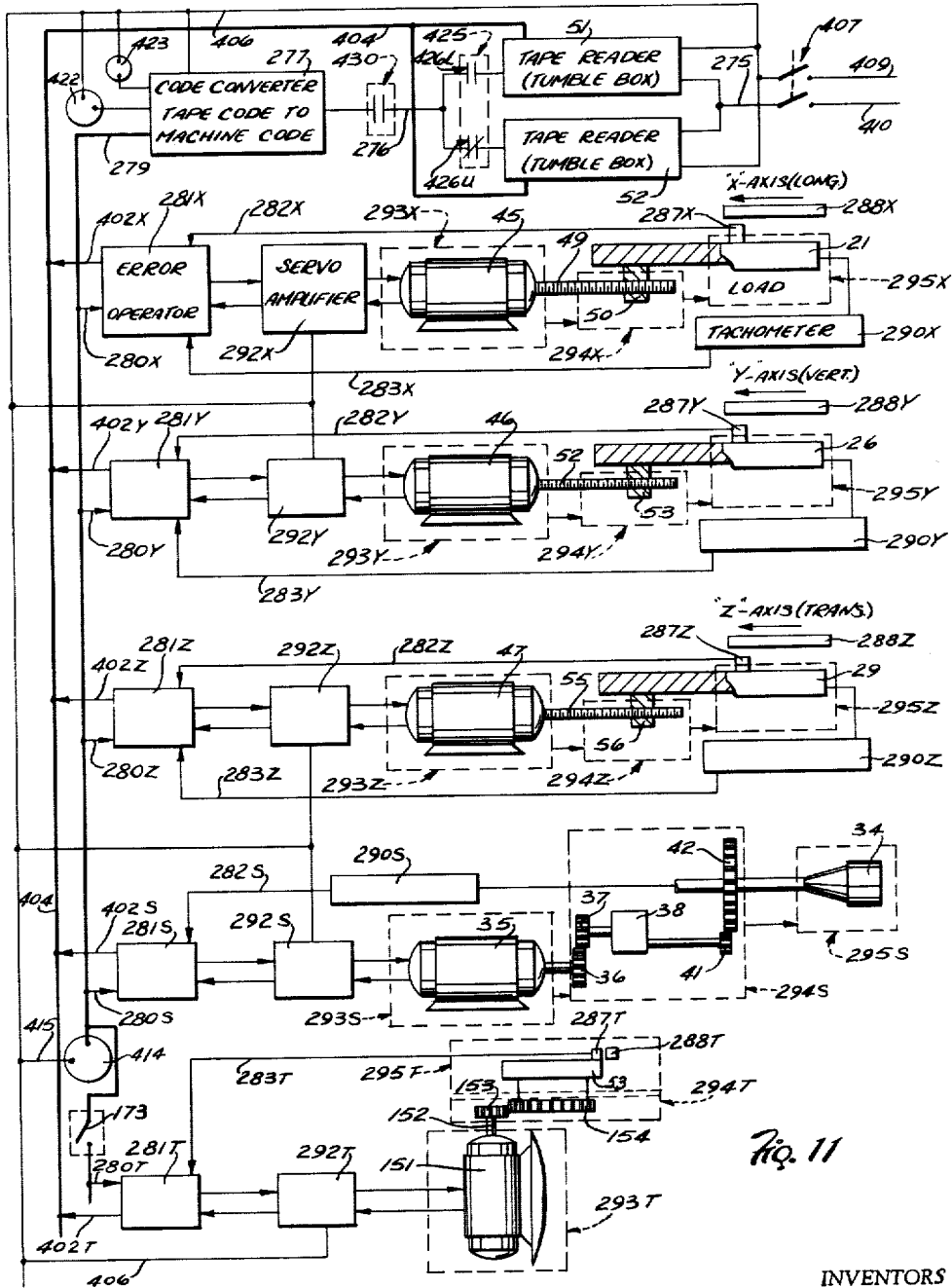

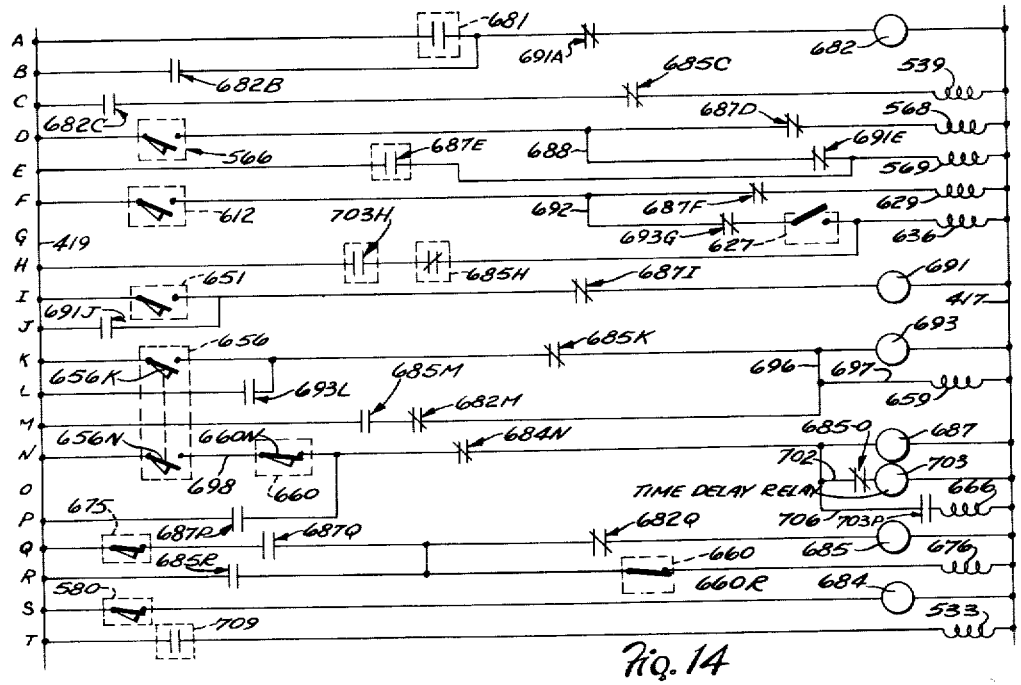

United States Patent Office

3,099,873
Patented Aug. 6, 1963

3,099,873
SHUTTLE OPERATED TAPE CONTROLLED MACHINE TOOL
Wallace E. Brainard, Milwaukee, and Kenneth R. Merner, Greendale, Wis., assignors to Kearney & Trecker Corporation, West Allis, Wis., a corporation of Wisconsin
Filed Nov. 28, 1958, Ser. No. 777,122
24 Claims. (Cl. 29—26)

This invention relates generally to automatic control systems for machine tools, and more particularly to a machine tool incorporating a work carrying shuttle mechanism and an associated numerical control system so interconnected as to render the machine operable to perform different programs of machining operations upon correspondingly different workpieces presented to the working station in intermixed sequence.

The prior art teaches both the application of a program or tape control system to a single machine having one working station, as well as the application of a conventional sequencing type control system adapted to effect a plurality of machining operations on a workpiece in a transfer machine having a plurality of different working stations. In tape control as applied to a single machine, it is possible to utilize either punched or magnetic tape to predeterminately program a plurality of machine movements for performing a plurality of desired machining operations upon a particular workpiece. Obviously, this type of machine control obviated the necessity for manual or semi-automatic control of machine movements and placed a machining cycle comprising a plurality of different positioning and machining operations under control of a punched or magnetic tape. The utilization of tape control in the machine arts obviously represented a considerable advancement in the art of machining metal workpieces to predetermined configurations. One principal advantage was the complete elimination of any manual control or adjustments during a preselected program of machine operations. Another advantage was the suitability of utilizing tape control for relatively small lot production, thereby gaining a few of the advantages of automation in small lot machining operations. After one lot of workpieces have been completed, another tape could be operatively associated with the control system for performing operations upon a different lot of workpieces. Tape control, as applied to a single machine, therefore reduced the principal manual operations performed by an operator to inserting a new tape in the machine control system at the start of machining a different lot of workpieces, and making whatever additional machine operation adjustments that were required at that time. One disadvantage of this arrangement, however, is the fact that the operator necessarily had to manually remove one workpiece after a machining program had been completed, and susbtitute the next workpiece prior to starting the machine for the next program cycle. In the case of relatively small, and simple workpieces, this presented no problem as the machine is idle for a relatively slight time during manual removal of one workpiece and placement of the next workpiece in the operating station. In the case of more complex workpieces, however, considerable time is necessarily required for the removal of a completed workpiece and replacement with a new workpiece prior to the next machine program. During the time required for setting up the next workpiece on the machine table, a single machine could be idled for a considerable period of time performing a repetitive program on complex workpieces in the same lot. Therefore, a machine could be idle or non-productive during approximately 50% of the total time required for performing repetitive programs of machine operations on a particular group of workpieces comprising one lot. Another disadvantage is that after setting up the machine to receive a particular workpiece, and inserting the tape appropriate for that workpiece, it is uneconomical to remove the tape and change the machine settings until a complete lot of workpieces had been completed.

The usual prior art transfer machines, on the other hand, comprise a plurality of different spaced apart working stations, with a transfer arrangement for sequentially advancing a workpiece from station to station, in a manner that a plurality of different required machining operations can be performed. Such machines usually are set up in advance to perform a plurality of different machining operations upon extremely large lots of workpieces. Furthermore, machines of this class are normally extremely complex and expensive, incorporating in addition to automatic transfer devices, automatic holding and positioning mechanisms to completely remove the necessity for manual adjustment or control during a sequence of machining operations. Although transfer machines are sometimes adapted to be adjusted for receiving workpieces of different configuration at the completion of one production run, this is not normally the case. In spite of the fact that transfer machines are usually limited to extremely large lots of workpieces, the principal advantage is, of course, the fact that nonproductive or idle time at any of the working stations is reduced to an absolute minimum. To achieve all of these advantages, however, it has been customary to design transfer machines for performing a plurality of different machining operations on a particular workpiece. In the event the transfer machine incorporated adjustment for receiving different workpieces, such workpieces usually had common characteristics and differed only in dimensions.

A principal object of the invention is to provide an improved machine tool control system.

Another object of the invention is to provide an improved shuttle type transfer mechanism.

Another object of the invention is to provide an improved shuttle transfer mechanism in combination with an improved index table.

Another object of the invention is to provide an improved system for activating a numerically controlled machine tool and comprising a plurality of separate program controllers selectively connectable to control machine operation.

Another object of this invention is to provide a greatly improved control system for a machine tool having a single working station in combination with a cooperating shuttle transfer mechanism so interconnected in the machine tool system as to effect alternate advancement of differently configured workpieces into the single operating station, together with means for activating the control system for performing an appropriate program of machining operations upon whichever of the workpieces is in the operating station.

Another object of this invention is to provide a machine tool and associated control system in which a single tool carrying spindle is operative to perform machining operations for a maximum of time during any operating period.

Another object of the invention is to provide a control system for a machine tool organization adapted to receive a wide variety of workpieces, means for performing a plurality of preselected programs of machining operations upon different kinds of workpieces, and shuttle type transfer means for sequentially advancing different kinds of workpieces into the machine operating station, together with means for automatically connecting the machine to be operated through a particular program of machining operations appropriate for the workpiece that is then advanced into the operating station.

Another object of the invention is to provide an improved machine tool organization and control system incorporating means for successively performing different programs of machining operations upon correspondingly different workpieces alternately advanced into a single machine working station, whereby a single machine tool may be utilized to perform a plurality of different programs of machining operations upon an intermixed sequence of workpieces successively advanced into the working station.

Another object of the invention is to provide an improved shuttle mechanism having two spaced apart unloading stations, together with means for transferring a completed workpiece from a machine operating station to one unloading station, and simultaneously therewith transferring an uncompleted workpiece from another unloading station to the machine operating station.

Another object of the invention is to provide a machine tool having a relatively movable tool support and cooperating work support connectable to be controlled for a predetermined program of relative work support and tool support movements by a selected one of a plurality of alternately connectable numerical tape control systems.

Another object of the invention is to provide a machine tool in combination with a plurality of different presettable program control systems respectively connectable to operate the machine for performing a predetermined sequence of machining operations upon a workpiece requiring that particular program of operations.

A further object of the invention is to provide the greatly improved effects of transfer machine operation in a single machine tool provided with a single working station and a single cooperatively disposed tool carrying spindle.

A further object of the invention is to provide in a machine tool having a bodily movable tool support and a cooperatively disposed bodily movable work support; a plurality of power driven translators connected to effect bodily movement of the work support and tool support in combination with a plurality of different presettable control systems alternately connectable to effect selected operation of the power driven translators for effecting different predetermined programs of movement of the tool support and work support, in a manner that the machine is operable to receive differently configured workpieces requiring different programs of machining operations.

A still further object of the invention is to provide a machine tool organization that is automatically operative to perform different selected programs of machining operations upon different workpieces alternately advanced into the machine operating station.

A still further object of the invention is to provide a machine tool organization including a cooperatively disposed work support and tool support in combination with an associated control system that is automatically operative to control machine movements for a plurality of different programs of predetermined cooperating movements, and including feedback control means operative to modify the operation of the control system.

According to this invention, a machine tool having a bodily movable tool support and a cooperatively disposed selectively indexable work support is provided with power driven translators responsive to a numerical control system. The numerical control system is operative to selectively activate the various power driven translators for effecting a selected predetermined program of positioning and velocity controlled bodily movements of the cooperating work support and tool support. Position indicating means associated with each of the axes of movement of the bodily movable tool support and work support, as well as velocity indicating means associated with these members and a power driven rotatable tool spindle are connected to modify the operation of the numerical control system in accordance with the input requirements. For activating the numerical control system, there are provided a plurality of different tape readers that are individually and selectively connectable to effect a predetermined program of machine movements for, in turn, effecting a predetermined program of machining operations upon a workpiece carried by the work support. A shuttle type transfer mechanism is provided to advance one work carrying pallet from the working station to an unloading station, and simultaneously therewith, advance a different work carrying pallet from a different unloading station into the machine operating station. By means of this arrangement, differently configured workpieces, having different dimensions and machining requirements, may be alternately moved into the operating station upon the worktable. Simultaneously with the movement of a different pallet and its associated workpiece into the working station, secondary control means are operative to connect a particular one of the tape readers for actuating the numerical control system in accordance with the machining requirements of the workpiece then advanced into the operating station. Power driven shuttle transfer means are selectively actuatable to initiate a shuttle movement, with the subsequent tape reader switching being performed automatically to initiate the required program of machining operations upon the workpiece corresponding to the requirements of that particular program. In the interval that one workpiece is being machined in the operating station, the other pallet, which has been moved into an unloading station, is reloaded with an uncompleted workpiece in preparation for the next, alternate program of machining movements. By means of this arrangement, it will be apparent that the tool spindle is operative to perform its primary function of machining a workpiece for a maximum of time during each operating period. For example, this invention provides a practical and operative means for effectively utilizing the tool spindle for performing machining operations approximately ninety (90) percent of the time. In average single machine tools well known in the prior art, by comparison, effective tool utilization is usually considerably less than fifty (50) percent of the total machine operating time. In other words, a much greater percentage of time has been heretofore required for initially setting up a machine to accommodate a differently configured workpiece; for unloading one completed workpiece from the machine operating station; and for properly mounting the next uncompleted workpiece in the work operating station as a prerequisite for starting the spindle to perform the next series of machining operations.

In a modified form of the invention, a tool storage drum including a tool change mechanism is carried in operative relationship with the single, power driven tool spindle, and is operative to automatically withdraw one tool from the spindle, and reinsert a different preselected tool in the spindle, according to the requirement of the machining program. Thus, different tools can be selected for insertion into the tool spindle in a manner that different kinds of machining operations may be effectively incorporated in the program of machining operations on either of the differently configured workpieces alternately presented to the working station.

Before starting a relatively continuous shuttle type program of machining operations, the tool storage drum is provided with a plurality of different cutting tools appropriate for one workpiece, and a plurality of other cutting tools appropriate for the alternately presented workpiece. Thus, with the tool storage drum and tool changer operatively associated with the tool spindle, each of the differently configured workpieces alternately advanced into the machine operating station may be completely machined without manually interchanging tools, or changing the machine set up. The tool storage drum, for example, is adapted to support a plurality of different cutting tools, such as drills, taps, and face mills of varying sizes that may be required for performing a particular series of machining operations upon either of the differently configured workpieces. In effect, with the tool storage drum and tool changer operatively interconnecting in the numerical control system for the machine, the single spindle machine tool embodying the novel features of this invention is adapted to perform a plurality of different machining operations that would be comparable to machining operations normally performed in a multi-spindle transfer machine. Thus, the single machine tool, with the novel features illustrated by the preferred embodiments fully disclosed in this application, is operatively adapted to provide the economies normally associated with transfer machine operation into relatively small lot production that has heretofore been most effectively accomplished by a plurality of different, single purpose machine tools.

The foregoing and other objects of the invention, which will become more fully apparent from the following detailed specification, may be achieved by means of the exemplifying embodiments, depicted in and described in connection with the accompanying drawings in which:

FIGURE 1 is a view in perspective of a machine tool embodying the principles of this invention, and showing a pair of work supporting pallets in combination with a novel shuttle type transfer mechanism;

FIG. 2 is an enlarged fragmentary view in transverse vertical section through a portion of the table supporting base, index table, and one of the work carrying pallets, and being taken generally along the line 2—2 in FIG. 5;

FIG. 3 is an enlarged fragmentary view in perspective showing the index table drive gear and the cooperating clutch element for retaining the worktable in a selective index position;

FIG. 4 is an enlarged fragmentary view, partly in front elevation, and partly in longitudinal vertical section of the table and the rightward portion of the shuttle mechanism, with certain parts broken away to illustrate the shuttle drive for one shuttle bar;

FIG. 5 is an enlarged fragmentary plan view of the rightward portion of the shuttle mechanism, showing one of the pallets moved into an operating station upon the rotary table, and the other of the pallets being retained in the unloading station;

FIG. 6 is an enlarged fragmentary plan view of the rotary table constituting the operating station, together with that portion of the shuttle mechanism spaced leftwardly from the rotary table;

FIG. 7 is an enlarged fragmentary view in transverse vertical section, taken generally along the lines 7—7 in FIG. 4, and showing the roller means for guiding the shuttle bar during longitudinal movement together with the associated drive means for effecting movement;

FIG. 8 is an enlarged fragmentary, detailed view illustrating the operating position of one of the pallet engaging fingers together with an associated shuttle bar and being taken generally along the line 8—8 in FIG. 5;

FIG. 8A is an enlarged fragmentary view in perspective of one of the pallet engaging fingers, together with its supporting bodily movable shuttle bar, and showing the cooperating cam actuated finger retracting mechanism;

FIG. 9 is an enlarged diagrammatic view illustrating the indexing and clamping mechanism for the rotary table, as well as the clamping mechanism for the pallet clamp, in combination with the associated actuating hydraulic circuit;

FIG. 10 is a line diagram of a control circuit for effecting a shuttle transfer movement, together with the associated actuating means for clamping and unclamping a pallet to the table, as well as operatively interconnecting a required one of the tape readers to actuate the numerical control system;

FIG. 11 is a diagrammatic block diagram of a preferred form of numerical control system for effecting machine movements in combination with diagrammatic representations of the power driven translators for effecting the various member movements;

FIG. 12 is a fragmentary perspective view of a modified form of the invention, illustrating a selectively indexable tool storage drum and tool change mechanism operatively associated with a single power driven tool spindle;

FIG. 14 is a schematic view of a hydraulic control circuit operative to effect a tool change cycle; and, FIG. 15 is a diagrammatic view of an electrical control circuit for actuating the tool change mechanism.

Figure 13:
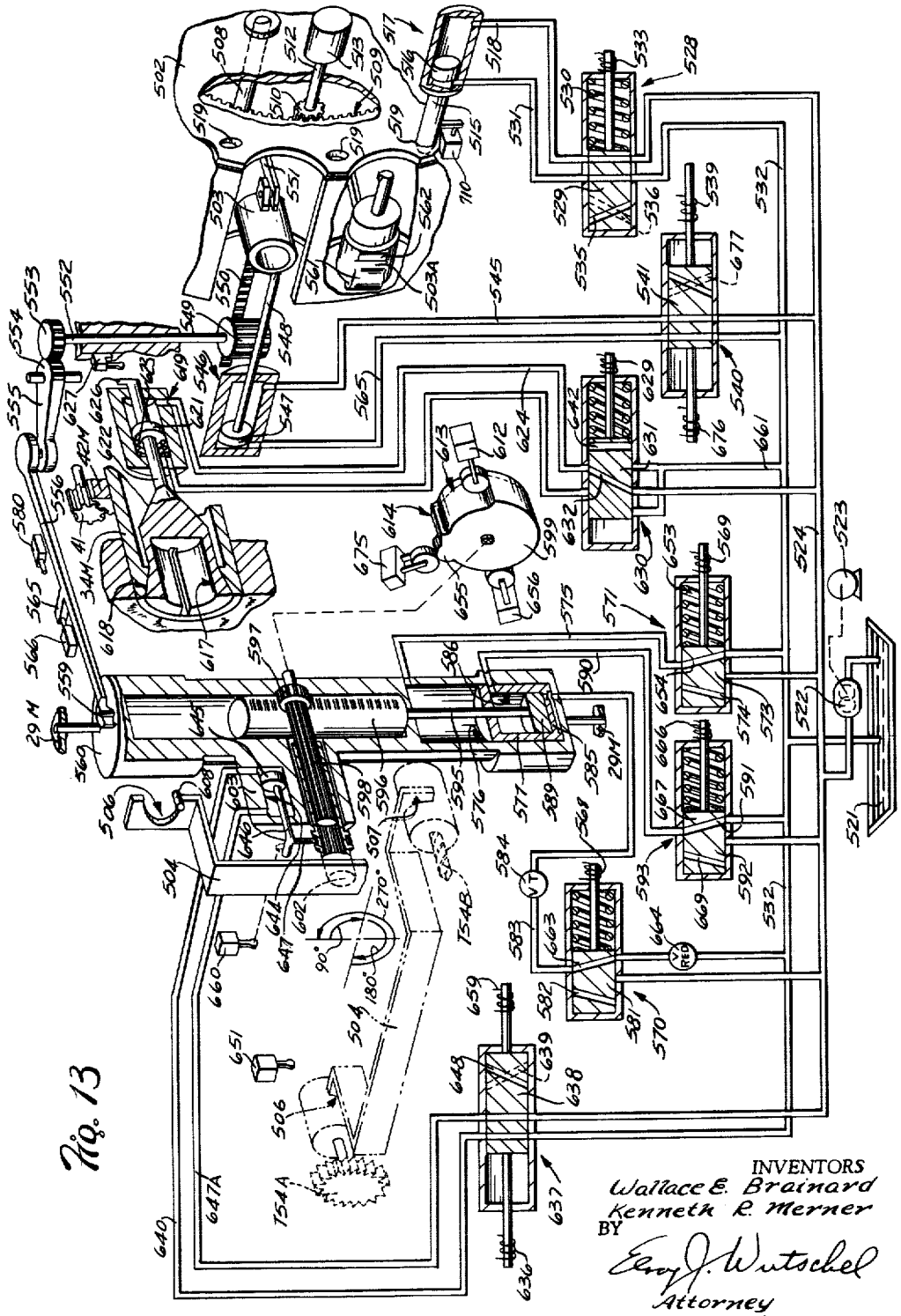
FIG. 13 is an enlarged fragmentary exploded perspective view of the tool change mechanism and associated tool supporting spindle, and illustrating all of the various movements necessary to effect a required tool change cycle.

Referring to the drawings, and particularly to FIGS. 1, 4 and 9, there is shown a machine tool of the bed type incorporating a preferred embodiment of the invention, and that is operable to perform a plurality of machining operations such as drilling, tapping, boring and face milling. The machine tool illustrated in FIG. 1 comprises essentially a rearwardly extending supporting frame or bed 18, having formed on its upper rearward portion a pair of spaced apart way surfaces 19 and 20 disposed to slidably support an upwardly extending vertical column 21 for longitudinal movement. The column 21 is integrally formed with a laterally extending base section 22, and is provided on its underside with way surfaces complementary to the way surfaces 19 and 20. A vertically movable saddle 26 is provided with vertically extending way surfaces (not shown) operative to engage way surfaces 27 and 28 presented by the column 21. In a similar manner, a spindle supporting head 29 provided with way surfaces 30 is guided by complementary way surfaces presented by the saddle 26 for transverse adjustment of a power driven tool spindle 34 that is journalled for rotation about a horizontal axis. The usual gibs (not shown) are operatively disposed to retain the spindle head 29, the saddle 26, and the column 21 in slidable engagement with their respectively associated supporting members in well known manner. By means of this arrangement, it will be readily apparent that the power driven tool spindle 34 is carried for bodily movement in three mutually perpendicular planes, indicated in the drawing as the X axis, Y axis, and Z axis.

As shown in FIG. 1 and as schematically represented in the block diagram, FIG. 11, power for driving the tool spindle 34 is derived from a reversible motor 35. From the motor 35, power is transmitted via gears 36, 37, and thence through a variable speed transmission 38 to rotate a gear 41 connected directly to drive a gear 42 secured to the rotatable tool spindle 34. Power for effecting bodily movement of the tool spindle 34 along the X, Y or Z axes, is supplied by reversible drive motors 45, 46 and 47 respectively. Each of the motors 45, 46 and 47 is of the reversible variable speed type, and each of them is connected to actuate screw and nut translating mechanisms respectively operable to effect movement of the column 21, saddle 26, and spindle head 29. As shown in FIGS. 1 and 11, the output shaft of the motor 45 is connected to rotate a feed screw 49 having operative engagement with a feed nut 50 fixedly secured to the underside of the column 21. The shaft of the motor 46 is connected to rotate a screw 52 that engages a feed nut 53 carried by the saddle 26. In a similar manner, the motor 47 is operative to rotate a feed screw 55 that is engaged by a feed nut 56 secured to the inner portion of the spindle head 29. By means of this arrangement, selective energization of the motors 45, 46 or 47 operates to effect a corresponding bodily rectilinear movement of the power driven tool spindle 34 along either the X, Y, or Z axes. Likewise, coordinate energization of two or more of the driving motors 45, 46 and 47 will operate to effect bodily movement of the tool spindle 34 along a resultant path of travel determined by the velocity of each of the slides along its separate axis. Normally, simultaneous energization of two or more of the motors is effected only for the purpose of moving the tool spindle 34 to a predetermined position as a prerequisite to operating a selected one of these motors for effecting a required work engaging machining operation.

As will hereinafter be more fully explained, the tape control system schematically shown in FIG. 11, is provided with two separate tape readers 51 and 52 and that are alternately and operatively connected to activate the motors automatically for moving the tool spindle through two different predetermined programs of successive machining cycles. Each of the machining cycles comprise two principal sequential components of movement, i.e. a positioning component and an actual workpiece engaging cutting component during which a cutting tool is moved from a particular preselected position to perform a selected machining operation. In some cases, of course, two machining operations may be effected from the same preselected position. Even in such cases, however, a machining cycle includes a signal for confirming the previous preselected position immediately prior to the next machining component of movement.

For supporting a workpiece during a machining operation, there is provided a rotary table 53 journalled for rotation about a vertical axis within the central forward portion of the frame 18, as shown in FIGS. 1 and 9. As will hereinafter be more fully explained, the rotary table 53 is selectively rotatable from a home position, represented in FIG. 1, to one of a plurality of index stations in a manner that machining operations may be performed upon a plurality of different faces of a workpiece (not shown) carried thereby. In order to actually support and secure a workpiece to the indexable table 53, there are provided two work carrying pallets 54 and 55. As shown in FIG. 1, the work pallet 54 is represented as being moved into an operating station above the worktable 53, and the pallet 55 has been moved to a loading and unloading station 57 that is spaced rightwardly from the worktable. During machine operation, and while a selected program of predetermined machining operations is being performed upon one workpiece carried by the pallet 54, a different completely machined workpiece is removed from the pallet 55, and another uncompleted workpiece of that configuration is secured to the pallet 55 by the machine operator. Thus, unloading and loading of the pallet 55 is effected in the loading station 57.

After a program of machining operations has been performed on a workpiece carried by the pallet 54, both of the pallets 54 and 55 are caused to be moved leftwardly, the pallet 54 being moved into a leftwardly spaced unloading station 58 and the pallet 55 carrying a new workpiece being moved into operating position upon the rotary table 53. A principal advantage of the present invention is the fact that workpieces requiring different programs of machining operations may be placed upon the pallets 54 and 55 respectively. The various movable machine members are automatically operative to perform two completely different programs of machining operations, in accordance with the particular workpiece and pallet that is moved into an operating position upon the rotary table 53. Thus, the machine is operable to perform two different programs of machining operations upon an intermixed sequence of workpieces alternately advanced by sequential movement of the pallets 54 and 55 into the operating station upon the rotary table 53 at the completion of each machining program upon the preceding workpiece.

In addiion, it will be apparent that workpieces of like configuration and requiring identical programs of machining operations may be sequentially moved into the working station by the pallets 54 and 55. In either case, one of the pallets 54 or 55 is moved into the working station upon the table 53, while the other of the pallets is in one of the unloading stations, 57 or 58, at which time a new workpiece is secured to that pallet. Therefore, the power driven tool spindle 34 is operative to perform cutting or machining operations continuously, excepting for a slight time interval required to effect a shuttle or transfer movement of the pallets, i.e., movement of one pallet into the working station upon the table 53 and corresponding movement of the other pallet from the working station to one or another of the unloading stations 57 or 58. Likewise, in either case, the control tapes (not shown) respectively advanced relative to the tape readers 51 or 52 must provide a program of machining operations required by workpieces advanced into the working station by the pallets 54 or 55 respectively.

Irrespective of whether the machine is utilized to perform successive different programs of machining operations upon an intermixed sequence of workpieces, or successive programs of identical machining operations upon a sequence of like workpieces, the tool spindle 34 is operative to perform its primary function of machining workpieces for a maximum of time during each operating period. In other words the tool spindle is continuously operable to machine an intermixed sequence of workpieces for approximately ninety (90) percent of the time. This invention completely obviates lost productive time of the tool spindle that is normally necessary in changing the machine set up or manually changing tapes whenever different workpieces are to be machined upon the same machine. It likewise provides a relatively continuous output of two different kinds of workpieces from a single machine. Thus, in industries requiring relatively small lots of production, the necessity of stockpiling or carrying in inventory completely machined lots of workpieces is reduced considerably. Heretofore, it has been customary to set up a machine for one kind of workpiece and machine a complete "lot" of 10 to 50 workpieces of that particular type. Next, the machine set up was changed to accommodate a different lot of workpieces and another "lot" of 10 to 50 workpieces of that type of workpieces machined and placed in inventory. Subsequently, workpieces were withdrawn from inventory for use in assembly operations. Obviously, in such well known prior manufacturing processes, relatively large quantities of completed workpieces were necessarily carried in inventory, with the inventory being replenished by similar size "lots" of the same type workpiece being machined with a single machine set up.

Utilization of the present invention greatly reduces the necessity for maintaining an inventory of completely machined parts. By providing an output of different completely machined workpieces from the same machine, the process of machining and subsequent assembly can be maintained on a relatively continuous basis, with intervening inventory being eliminated or reduced to an absolute minimum. Although the embodiment of the invention in this disclosure illustrates two pallets and an associated machine controlled for sequentially producing two workpieces, the inventive concept of intermixing workpieces from a single machine is deemed to include any practical larger number of pallets and workpieces.

To guide and support the work pallet 55 for movement from the worktable 53 to the unloading station 57, the frame 18 is provided with spaced apart way surfaces 60 and 61. In a similar manner, the pallet 54 is guided for leftward movement to the unloading station 58 upon way surfaces 62 and 63 integrally formed with the supporting frame 18. Both of the pallets 54 and 55 are provided with complementary way surfaces respectively disposed to engage the left frame way surfaces 62, 63 and the right frame way surfaces 60 and 61. As a prerequisite to effecting shuttle or transfer movement of a pallet in either direction, it is necessary that a clamp element 66 carried by the rotary table 53 for vertical movement is in upper, unclamped position in a manner that spaced apart way surfaces 67, 68, integrally formed with the clamp element are aligned with the cooperating frame way surfaces 62, 63 and 60, 61.

The condition illustrated in FIG. 1 occurs immediately prior to a leftward shuttle movement of the pallet 54 to the unloading station 58 and a corresponding leftward movement of the pallet 55 into an operating station upon the clamp element ways 67, 68 above the rotary table 53. As there shown, the worktable 53 has been indexably returned to its home position in which the ways 67 and 68 are longitudinally aligned with the frame ways, and the clamp element 66 elevated upwardly to move the upper surfaces of the ways 67, 68 into horizontal alignment with the cooperating frame ways. Likewise, a longitudinally movable transfer bar 72 supported for reciprocable movement in outer rollers 73 and spaced apart inner rollers 74 is retained in an extreme leftward parked position. Each pair of the spaced apart rollers 73, 74 are respectively journalled to rotate about corresponding pairs of upwardly extending shafts 77, 78 fixedly secured to the supporting frame 18. Whenever the left transfer bar 72 is in its extreme leftward position, as shown in FIGS. 1 and 6, a pair of pivotably mounted transfer fingers 82 and 83 are urged into downward, fully retracted position by means of inwardly extending cam actuating pins 84 and 85 that are fixedly secured to the frame 18. Thus, with the transfer bar 72 in extreme leftward position, the transfer fingers 82 and 83 are fully retracted to permit a leftward movement of the work supporting pallet 54 from the operating station to the unloading station 58 upon the left frame ways 62 and 63.

The transfer bar 72 is in the same horizontal plane, although spaced apart laterally from a transfer bar 88, which is guided for reciprocable transfer movement from a rightward parked position, shown in FIGS. 4 and 5, by means of a plurality of outer rollers 89 and cooperating inner rollers 90. Each of the opposed spaced apart transfer rollers 89, 90 is journalled to rotate about corresponding pairs of vertically disposed shafts 93 and 94 secured to the rightward portion of the supporting frame 18. Prior to initiating a leftward shuttle movement, the transfer bar 88 is in an extreme rightward position in a manner that transfer fingers 96 and 97 pivotably secured thereto are in downwardly retracted position.

Whenever the transfer bar 88 is moved to an extreme rightward position, the transfer fingers 96 and 97 are retained in downwardly retracted position by means of inwardly extending, horizontally disposed cam actuating pins 98 and 99 fixedly secured to the rightward portion of the frame 18. Inasmuch as each of the transfer fingers 96, 97 associated with the transfer bar 88, as well as the retractable transfer fingers 82, 83 associated with the transfer bar 72 operate in identical fashion, it is deemed necessary to describe in detail the operation of only one of these fingers, as shown in FIGS. 8 and 8A. As there indicated, the transfer finger 96 is disposed within a vertical slot or pocket 102 formed toward the leftward end of the transfer bar 88. A horizontal pin 103 extending through the slotted end of the bar 88 pivotably supports the retractable transfer finger 96 in a manner that a compression spring 104 disposed within a circular vertical recess formed in the finger operates to normally urge the finger 96 upwardly. Upward movement of the finger 96 is limited by engagement of the rightward underside thereof with the lower wall of the slot. As the transfer bar 88 is moved to its extreme, rightward parked position, a laterally extending cam plate 105 secured to the side face of the finger 96 is engaged by the inwardly extending cam actuating pin 98. The pin 98 engages the cam plate 105 to urge the transfer finger 96 downwardly into retracted position within the pocket 102 in opposition to the spring 104.

The fully retracted position of the finger 96 is shown more clearly in the transverse sectional view, FIG. 7, in which the laterally extending cam engaging pin 98 is shown as being carried by a vertical support plate 106 secured at its lower end to the frame 18. As further indicated in FIG. 7, the guide rollers 89 and 90 are respectively provided with inwardly tapered, frusto-conically shaped opposite ends in a manner to engage the opposite circular sides of the semicircular shuttle transfer bar 88. To prevent rotational movement of the shuttle bar 88, the opposite side faces of a gear rack 108 fixedly secured to the underside thereof, are engaged by the opposed, horizontally formed faces of guide shoes 109 and 110 respectively. The guide shoes 109 and 110 are secured to the inner ends of transverse support plates 112 and 113, the outer ends of which are fixedly secured to the vertically extending side walls of the frame 18. In addition to carrying the guide shoes, the support plates 112 and 113 likewise constitute a supporting base for the guide roller shafts 89 and 90 respectively, and the vertical support plate 106. Inasmuch as all of the guide rollers 89 and 90, spaced along the frame 18 in opposed pairs as shown in FIG. 5, are supported in generally similar fashion, the description pertaining to FIG. 7 is deemed sufficient to describe this entire arrangement with one exception. As shown in FIG. 5, the cam engaging pin 99 is secured to the upper end of a vertical support plate 107 extending upwardly from the transverse plate 112 and operates to engage a laterally extending cam plate 117 secured to the outer face of the rear pallet engaging, shuttle finger 97. Thus, during a leftward shuttle movement of the bar 88, the laterally extending pin 98 associated with the forward transfer finger 96 will not interfere with the oppositely extending cam plate 117.

For effecting reciprocable transfer movement of the shuttle bar 88, as shown in FIGS. 4 and 7, the gear rack 108 fixedly secured to the underside of the bar 88 is engaged by a gear 118 carried by a horizontal shaft 119 journalled at its opposite ends within bearings (not shown) carried by the opposite walls of frame 18. Power for rotating the gear 118 to effect the required reciprocable shuttle movement of the bar 88 is derived from a reversible hydraulic motor 120 secured to the outer front wall of the frame 18 and connected to rotate the shaft 119.

In a similar manner, as shown in FIGS. 1, 6 and 9, power for effecting reciprocable movement of the shuttle bar 72 is derived from another hydraulic motor 122 secured to the outer front wall of the frame 18. The motor 122 operates to rotate a pinion 123 having meshing engagement with a longitudinally extending gear rack 124, FIG. 9, secured to the underside of the shuttle bar 72. The arrangement for restraining the shuttle bar 72 against rotation; rotatably supporting the guide rollers 73, 74; and, effecting movement of the transverse fingers 82, 83 to downward retracted position is generally similar to that hereinbefore described with reference to FIGS. 4, 7 and 8. It should be noted, however, that the oppositely disposed, inwardly extending cam engaging pins 84 and 85, FIG. 6, operate to engage oppositely extending cam flanges 127, 128 respectively secured to the opposite side faces of the pivotable transfer fingers 82 and 83. This is necessary, as hereinbefore explained with reference to the guide bar 88, in order that the laterally extending pin 85 will not interfere with the cam plate 127 secured to the leftward transfer finger 82 during a full rightward transfer movement of the bar 72.

Inasmuch as the operating cycles for the shuttle bars 72 and 88 are identical, it is deemed necessary to describe only one complete operating cycle for the shuttle bar 88 for illustrative purposes. It will be apparent that the bars 72 and 88 are alternatively operable in accordance with the position of the work carrying pallets 54 and 55 respectively. In other words, whenever the pallets 54, 55 are positioned as shown in FIG. 5, the transfer bar 88 is caused to move leftwardly to in turn move both of the pallets to the positions indicated in FIG. 6. At the completion of a program of machining operations upon a workpiece carried by the pallet 55, FIG. 6, the shuttle bar 72 is then caused to move rightwardly for moving the pallet 55 to the unloading station 57 and returning the pallet 54, with a different workpiece secured thereto, into an operating position above the indexable work supporting table.

To initiate a leftward shuttle movement, the motor 120 is energized to effect counterclockwise rotation of the gear 118 for in turn effecting leftward longitudinal movement of the rack 108 and shuttle bar 88, as shown in FIGS. 4 and 7. As the cam plates 105 and 117 are moved out of engagement with the fixedly positioned lateral pins 98 and 99, during leftward movement, the pivotable fingers 96 and 97 are resiliently biased upwardly to their pallet engaging positions, FIG. 1. During continued leftward movement of the bar 88, the fingers 96, 97 engage the rightward side faces of the pallets 54, 55 respectively to effect a leftward transfer movement.

Whenever the worktable is in its home position and the clamp member 66 elevated to a disengaged position as required for the start of a transfer movement in either direction, a plurality of guide rollers carried by the clamp member 66 for rotation about vertical axes are properly aligned with the various guide rollers carried by the frame 18. As shown in FIGS. 2 and 5, guide rollers 130 to 133 inclusive are rotatably supported by four separate vertical shafts 134, 135, 136 and 137 spaced equidistant from the axis of rotation of the table and being secured at their lower ends to the clamp element 66. Thus, during continued leftward movement of the guide bar 88, the forward end thereof is supported by being engaged between the outer roller 130 and the center rollers 131, 133. Upon further leftward movement, the leftwardly moving transfer bar 88 is engaged between one of the rollers 74 and a cooperatively disposed roller 141, as shown in FIG. 6. Leftward movement of the guide bar 88 continues until the pallet 55 is properly positioned over the rotary table 53 and the pallet 54 is moved into the left unloading station 58. As this occurs, the extreme leftward end of the rack 108 secured to the underside of the bar 88 engages the actuating plunger of a limit switch 142 that is operatively connected to effect reversed rotation of the motor 120, as shown in FIGS. 6 and 9. Thereby, the motor 120 operates to rotate the pinion 118 in a clockwise direction for immediately returning the guide bar 88 to its extreme rightward, parked position in which the pallet engaging fingers 96, 97 are retained in downwardly retracted position, as hereinbefore explained. Upon arrival of the guide bar in rightward parked position, the rightward end of the rack 108 secured to the bar engages an actuating plunger associated with another limit switch 145, which is connected upon actuation to effect de-energization of the motor 120.

In a similar manner, upon a rightward shuttle movement of the work carrying pallets, a reverse limit switch 147, FIG. 5, is positioned to be actuated by the rack (not shown) secured to the underside of the transfer bar 72. Actuation of the switch 147, upon return arrival of the pallets 54, 55 to the positions shown in FIG. 5, operates to effect reversed rotation of the motor 122 for returning the guide bar 72 to its extreme leftward parked position, shown in FIG. 6. As this occurs, and with the pallet engaging fingers 82, 83 pivotably moved to downward retracted position, a limit switch 148 is actuated to stop rotation of the motor 122 for retaining the guide bar 72 in parked position during a later, subsequent shuttle cycle movement of the other guide bar 88, FIG. 5.

In order to effect the required alternate actuation of the shuttle transfer bars 72 and 88 in properly coordinated relationship with movement of the clamp element 66 to upper disengaged position at the completion of a program of machining operations, FIG. 1, there is provided a hydraulic control circuit, as schematically represented in FIG. 9. The hydraulic control system is operable to effect the required vertical movement of the clamp element 66, as well as effecting the required vertical movement of the supporting rotatable table 53 relative to the supporting frame. Vertical movement of the table 53 is necessary to disengage the table from one angularly clamped, indexed position as a prerequisite to effecting the required rotational movement of the table to its next selected index position. The structure and mode of operation of both the vertically movable clamp element 66 and cooperatively movable work supporting table 53 is more fully shown and disclosed in United States Patent, Serial No. 3,054,333, issued to Wallace E. Brainard.

Whenever the clamp element 66 is urged downwardly to clamp a pallet, such as the pallet 54 in FIG. 9, to the table 53, the table may be elevated to unclamped position, permitting energization of a drive motor 151 for rotating the table to its next selected index position at which time it is reclamped to the bed. As shown in FIGS. 2, 9 and 11, the motor 151 is connected to rotate a vertically journalled shaft 152 carrying a pinion 153 having meshing engagement with a ring gear 154 integrally formed with the inner hub of the worktable 53. Upon arrival of the table 53 at its next selected index position, the motor 151 is de-energized and the entire table together with the pallet clamped thereto is moved downwardly into clamped engagement with the supporting frame 18. For retaining the table 53 in clamped engagement with the supporting frame 18, there is provided a disengageable coupling 156. To this end, the central hub 150 of the table is provided on its lower face with circumferentially spaced, radially formed angular clutch teeth 157 disposed to have meshing engagement with complementary clutch teeth 158 integrally formed toward the central portion of the frame 18. Movement of the table 53 together with its supporting hub 150 downwardly operates to urge the clutch teeth 157 into tight meshing engagement with the fixed clutch teeth 158, thus retaining the table in a selected position of angular adjustment, as well as positioning it in a plane perpendicular to the axis of table rotation.

To support the table 53 for both rotatable and vertical axial movement, the inner portion of the hub 150 is rotatably journalled about a sleeve bearing 160 integrally formed toward the upper end of an axially movable tubular support element 161.

The tubular support element 161 is restrained against rotation and guided for vertical slidable movement within a vertically bored opening 162 constituting a circular bearing surface and being formed within the central portion of the frame 18. At its lower end, the tubular element 161 is secured to a transverse plate 163 having secured to its opposite upper faces a pair of vertically upstanding cylinders 164 and 165. Stationary, vertically disposed piston rods 169 and 170 secured at their upper ends directly to the stationary frame 18 are provided at their lower ends with stationary pistons 171 and 172 respectively carried for slidable movement within the cooperating spaced apart cylinders 164 and 165. By means of this arrangement, it will be apparent that the tubular support 161, transverse plate 163, together with the cylinders 164 and 165 are vertically movable relative to the stationary pistons 171 and 172 respectively carried for slidable movement within the cooperating spaced apart cylinders 164 and 165. It will be apparent, likewise, that the tubular element 161 and transverse plate 163 are constrained against rotational movement. Switches 173 and 174 are actuated upon vertical movement of the tubular member 161 and support plate 163. Whenever the table 53 is elevated to its disengaged position, as shown in FIG. 9, the leftward end of the support plate actuates switch 173. In a similar manner, upon movement of the table 53 and tubular support member 161 to downward clamped position with the radial clutch teeth 157 engaging the complementary clutch teeth 158, the support plate 163 actuates switch 174.

For effecting vertical movement of the table 53, the cylinders 164 and 165 are connected to be hydraulically actuated relative to the stationary pistons 171 and 172. To accomplish this, the hydraulic circuit is activated by energizing a motor 177 by means of a control circuit (not shown) in well known manner. The motor 177 is connected to drive a pump 178 connected to withdraw fluid from a sump 179 and transmit fluid under pressure to a main pressure supply line 180. From the pressure supply line 180, the flow of fluid continues via a predeterminately adjusted throttle control valve to a branch line 183 connected to an inlet port formed in a control valve 185. With a spring 186 urging an axially slidable valve spool 187 leftwardly, as shown in FIG. 9, pressure fluid is transmitted from the control valve 185 through a drilled line formed in the valve spool 187 to a hydraulic line 190 connected at its opposite ends to supply pressure fluid to the upper ends of the cylinders 164 and 165 respectively. Admission of pressure fluid to the upper ends of the cylinders 164, 165 from the line 190, in turn, operates to effect upward movement of the worktable 53 to its disengaged or unclamped position. At the same time, fluid is exhausted from the lower ends of the cylinders 164 and 165 by a line 191, connected via a drilled line 192 formed in the leftwardly moved valve spool 187, and thence via exhaust lines 193 and 194 to the sump 179.

At the completion of a selected table indexing movement in response to controlled energization of motor 151, downward clamping movement is effected by energizing a solenoid 195 to effect rightward movement of the valve spool 187. As this occurs, fluid is exhausted from the upper ends of the cylinders 164 and 165 by means of the line 190 which is then connected via a drilled line 198 in the rightwardly displaced valve spool 187 to the exhaust line 193. At the same time, fluid under pressure is transmitted from the hydraulic line 183 via a drilled line 199 in the valve spool to the line 191 for supplying pressure fluid to the lower end of the cylinders 164 and 165. Pressure fluid admitted to the cylinders below the pistons 171, 172 effects downward movement of the table 53 thereby urging clutch teeth 157 into meshing engagement with clutch teeth 158 in the selected index position, effecting both a slight angular final positioning movement and retaining the table in its selected indexed position.

To properly locate a pallet as it is urged into downward clamping engagement with the table 53, as shown in FIGS. 2, 5 and 9, the upper surface of the worktable 53 is provided with four frusto-conically shaped locating pins 202 to 205 inclusive. The tapered locating pins 202 to 205 inclusive are respectively disposed to cooperate with four complementary tapered recesses formed in the lower faces of inwardly extending flanges 208 and 209 secured to the opposite side walls of the pallet. Two of the tapered pallet recesses 211 and 212 are clearly shown in FIG. 2, in a position to engage the cooperatively disposed tapered table locating pins 202 and 203. As the pallet 54 is urged downwardly into clamped engagement with the table, the four locating pins carried by the table engage the cooperating tapered recesses presented in the pallet to properly locate and support the pallet relative to the table 53 and the cooperating tool spindle 34.

As schematically represented in FIG. 9, the clamp element 66 has been urged downwardly from its transfer position to securely clamp the cooperating pallet 54 to the table 53. To accomplish the required vertical pallet movement, the underside of the clamp element 66 is secured to the upper end of an axially movable support rod 214. The rod 214 is guided for vertical axial movement by means of a bored opening formed in a transverse bearing plate 215 secured within the upper end of the tubular support member 161. The upper clamp rod 214 is secured by means of a pivotal coupling 216 to a piston rod 217 that is secured to a piston 219 constrained for slidable movement within a cooperating cylinder 220 formed within the lower central portion of the tubular support member 161. Thus, movement of the piston 219 within the cylinder 220 effects a corresponding movement of the pivotably interconnected rods 217 and 214 to effect the required vertical movement of the clamp element 66. Inasmuch as the worktable locating pins are utilized to initially position the pallet, the piston 219 is first urged downwardly under a low clamping pressure with a subsequent high clamping pressure being applied for retaining the pallet 54 in tight engagement with the table 53 during machining operations. To accomplished this, pressure fluid from the main high pressure supply line 180 is connected via a throttle control valve 221 to a pressure differential valve 222 which is operative in a well known manner to supply hydraulic fluid at the required reduced pressure to a branch line 223. Inasmuch as the pressure differential valve 222 operates to reduce the pressure and volume of fluid to the line 223, the valve is connected to return a predetermined quantity of fluid to the sump 179 via a by-pass line 224. To effect downward clamping movement of the pallet 54, a valve spool 226 of a clamp control value 227 is normally urged to its extreme rightward position by means of a solenoid 228.

With the valve spool 226 moved rightwardly, as shown in FIG. 9, the flow of fluid under reduced pressure continues from the line 223 via a drilled line in the valve spool to a line 231 connected directly to the upper end of the cylinder 220, thus urging the piston 219 and pallet clamp 66 downwardly under low clamping pressure. Whenever reduced clamping pressure is being applied to the piston 219 the flow of fluid from line 231 through a branch line 232 is prevented by a leftwardly displaced valve spool 233 of a high pressure clamp valve 234. During low pressure clamping, a spring 235 operates to retain the valve spool 233 in resiliently biased leftward position.

As soon as the pallet is properly located upon the table 53 in response to low pressure clamping, solenoid 228 is de-energized and a solenoid 238 associated with the valve 234 is energized to effect rightward movement of the valve spool 233. Upon movement of the valve spool 233 to its rightward position, fluid under normally high pressure is transmitted from the main supply line 180 via a branch line 239, and thence through a drilled line 240 formed in the rightwardly displaced valve spool 233 to the branch line 232, connected directly to the clamp supply line 231. Thereupon, the piston 219 is urged downwardly under full clamping pressure to securely retain the pallet in engagement with the supporting table 53 during subsequent machining operations.

Irrespective of whether the pallet is urged downwardly under low or high clamping pressure, fluid is exhausted from the lower end of the cylinder 220 via a line 242 and thence through a drilled line in the rightwardly moved valve spool 226 that is connected to the exhaust line 193, 194.

To unclamp a pallet, and elevate the clamp element 66 to upward position for the next shuttle movement, a solenoid 243 associated with the control valve 227 is energized. The valve spool 226 is urged leftwardly in response to energization of the solenoid 243 to connect the pressure supply line 223 via a cannelure 244 to the line 242. Fluid pressure admitted to the lower end of the cylinder 220 effects upward movement of the piston 219 with a corresponding upward movement of the clamp element 66 to align the way surfaces presented thereby for a subsequent shuttle movement. With the piston moved upwardly, fluid is exhausted from the upper end of the cylinder 220 via the line 231 and thence through a valve spool cannelure 245 to the exhaust line 193. Movement of the piston 219 upwardly causes a dog carried by a lower extension of the piston rod 217 to actuate a switch 247. Conversely, whenever the piston rod 217 is urged downwardly to clamp the pallet to the table, as shown in FIG. 9, a switch 248 is actuated.

At the completion of one program of machining operations, a shuttle cycle can be initiated providing the table 53 has been indexably returned to its home position and clamped; and providing the pallet clamp element 66 is elevated to properly align the clamp ways with the co-operating table ways. Assuming that this has been done, leftward reciprocable movement of the bar 88 with an automatic return to its rightward parked position is accomplished by a control valve 249 which is interconnected in the hydraulic control circuit shown in FIG. 9. In a similar manner, in the event a rightward shuttle cycle is required, a control valve 250 is operative to effect required operation of the hydraulic motor 122 for moving the shuttle bar 72. As will hereinafter be more fully explained with reference to the electrical control circuit, FIG. 10, and block diagram, FIG. 11, selected actuation of one or another of the valves 249 and 250 is accompanied by a switching function for operatively connecting one or another of the tape readers 51 or 52 to control machine movement for effecting a predetermined program of machining cycles in accordance with the actual workpiece and pallet being moved into the operating station upon the indexable worktable 53.

Upon energization of a solenoid 253 associated with the valve 249, a valve spool 254 is urged leftwardly, thereby connecting the high pressure line 180 to supply fluid to a motor supply conduit 255. Pressure from the supply conduit 255 effects the required counterclockwise rotation of the motor 120 to effect leftward movement of the rack 108 and shuttle bar 88. Whenever the motor 120 is being rotated in a counterclockwise direction, fluid is exhausted therefrom via a conduit 256, and thence through a drilled line in the leftwardly displaced valve spool 254 to the main exhaust line 194. At the completion of a leftward shuttle stroke of the bar 88, reverse limit switch 142 is actuated to effect de-energization of the solenoid 253 and energization of a solenoid 258 associated with the control valve 249. Energization of the solenoid 258, in turn, effects rightward movement of the valve spool 254 to connect the main pressure supply line 180 via a drilled valve spool line 259 to the motor supply conduit 256. Pressure from the line 256 effects clockwise rotation of the motor 120 for returning the shuttle bar 88 to its extreme rightward parked position, the return flow of fluid from the motor 120 then being transmitted via a line 255 and a drilled line in the rightwardly displaced valve spool 254 to the main exhaust line 194. Upon arrival of the shuttle bar 88 in its extreme rightward parked position, switch 145 is actuated to effect de-energization of the solenoid 258 permitting resiliently biased return of the valve spool 254 to a central neutral position for interrupting the transmission of pressure fluid or exhaust fluid to the motor supply lines 256, 255. The usual adjustable throttle control valves (not shown) may be operatively interconnected in the motor supply lines 256 and 255 respectively.

A rightward shuttle movement of the bar 72 may be effected in a similar manner by energizing a solenoid 262 for effecting rightward movement of a valve spool 263 associated with the control valve 250. Upon rightward movement of the valve spool 263, pressure fluid is transmitted from the main supply line 180, via a drilled line in the valve spool to a motor supply line 264 for effecting the necessary clockwise rotation of the motor 122 to move the shuttle bar 72 in a rightward direction. Fluid is exhausted via a line 266 connected via a valve spool line 268 of the rightwardly moved valve spool to the exhaust lines 193 and 194.

Reverse movement of the shuttle bar 72 upon completion of a rightward shuttle movement is effected by actuation of the switch 147 connected to effect de-energization of the solenoid 262 and, simultaneously therewith, energization of a solenoid 269. As this occurs, the valve spool 263 is urged leftwardly to connect the pressure supply line 180 to conduit 266 for effecting counterclockwise rotation of the motor 122. Thereupon, the rack 124 and bar 72 are moved in a leftward direction, with leftward movement being stopped in a parked position upon actuation of the limit switch 148. The limit switch 148, in turn, is connected to effect the required de-energization of solenoid 269, permitting return movement of the valve spool 263 to a resiliently biased neutral position interrupting the flow of pressure fluid to either of the supply conduits 264 or 266.

One of the principal advantages of this invention is the fact that either the tape reader 51 or the tape reader 52 is selectively connectable to actuate the numerical control system diagrammatically illustrated in FIG. 11, for effecting a predetermined program of machining cycles upon a particular workpiece. For example, as hereinbefore explained, the tape reader 51 is connected to effect a program of machining operations upon a workpiece carried by the pallet 54, FIG. 1. After a workpiece carried by the pallet 54 has been completely machined according to information provided by the tape reader 51, a differently configured workpiece supported by the pallet 55 is then moved into operating position upon the rotary table as the pallet 54 is moved leftwardly into the unloading station. As a concomitant to movement of the pallet 55 and its associated workpiece into the operating station, the tape reader 51, FIG. 11, is disconnected from the numerical control system and the tape reader 52 connected to actuate the numerical control system for a different predetermined program of machining operations, according to the requirements of the workpiece carried by the pallet 55. This novel arrangement for operatively interconnecting a particular tape reader capable of supplying coded information according to the requirements of a particular associated workpiece provides a practical means for machining alternate workpieces within the range of machine capacity.

Although the inventive concept is represented by a preferred embodiment including the various structural views and the schematic block diagram shown in FIG. 11, another principal advantage of the invention is that all of the components diagrammatically illustrated in FIG. 11 are commercially available and do not have to be specially designed or manufactured to attain the greatly improved new results occurring from the practice of this invention.

The tape reader 51 is adapted to transmit digital information from moving tape (not shown) of the well known punched type. In this preferred embodiment of the invention, the tape reader is provided with a plurality of switches operative in a binary code form by means of switch plungers engaging appropriately spaced holes in the punched tape, as the tape is mechanically advanced relative to the reader. These readers are similar to readers used in conventional office equipment. The punched tape is the endless type and, irrespective of length, will be disposed loosely in a plurality of superimposed loops within a carrier described commercially as a tumble-box. Thus, it is unnecessary to provide reversal of the tape spools at the completion of one program of machine operations.

As shown in FIG. 11, tape readers 51 and 52 are interconnected in parallel between an energized input conductor 275 and a conductor 276 connectable to activate a code converter 277 that is operative, in turn, to convert information from the tape code to decimal code; and in well known manner, store this information in alternately used registers in the form of sine-cosine voltage ratios for predeterminedly selected point to point positioning and linear voltage ratios for velocity control. In addition to converting and storing information for the X, Y and Z axes, the code converter 277 is also operative to store information in binary code form relative to the required speed of the spindle 34; the selected indexed position of the rotatable work supporting table 53; and, as will hereinafter be more fully explained, for tool selection in a modified form of the invention.

From the code converter 277, machine operating input information is transmitted to a common trunk line 279 containing a plurality of branch conductors connected to different error operators.

To simplify the description, the five branch conductors and error operators have been respectively designated by common numerals 280 and 281, each being followed by an appropriate letter suffix to indicate the particular movement being controlled. For example, the error operator 281X is operative in well known manner to receive feedback information via the lines 282X and 283X, respectively being operatively connected to supply feedback information as to the position of the column 21 along the X axis, and to supply information as to the velocity of the column 21 as it is being moved along the X axis. To provide accurate position feedback information, the line 282X is connected to a position indicator or reading head 287X which is secured to the column 21, as shown in FIGS. 1 and 11. The reading head 287X is carried for movement relative to a cooperating scale 288X which is secured directly to the frame and connected to be energized by means of conductors (not shown). The cooperative coaction between the reading head 287X and the scale 288X provides an accurate feedback signal to indicate the exact position of the column along the frame as it is moved along the X axis. The cooperating reading head 287X and scale 288X are schematically representative of well known commercially available units that are operative in the manner described.

In a similar manner, to provide feedback information as to the velocity of the moving column 21 along the cooperating frame, the line 283X is connected to receive information from a tachometer 290X which is connected to be driven by movement of the column 21. The error operator 281X operates to produce voltage proportional to the magnitude of the error, as well as polarity indicating the direction of position error. The voltage ratios and binary numbers stored in the code converter 277, irrespective of whether they are operative to obtain position or velocity input signals, are compared to the corresponding voltage ratios and binary numbers from the feedback conductors connected to the error operator 281X, with motion being stopped upon the occurrence of coincidence between the feedback supply and the code converter information.

From the error operator 281X, command control information is transmitted to actuate a servo-amplifier 292X which is directly connected to accurately control the velocity and extent of movement of a reversible power actuator 293X. The power actuator 293X may comprise either a valve controlled hydraulically operated servomotor (not shown) or an electric motor 45, as represented in the drawings, which is directly connected to drive the column moving translating screw 49. Thus, in the preferred embodiment illustrated in the drawings, the servo-amplifier 292X is operative to control movement of the motor 45 through armature or field supply in well known manner. The general arrangement for effecting movement of the column 21 along the X axis is similar to that utilized for effecting required movement of the saddle 26 along the X axis, spindle head 29 along the Z axis, velocity of the spindle 34 and positioning movement of the indexable rotary table 53.

As schematically represented in block diagram form, in FIG. 11, the power actuator 293X is connected to drive a translating mechanism 294X, which, in turn, is directly connected to a load 295X, in this case represented by the column 21. Actually, the translating mechanism 294X is represented as the cooperating screw 49 and nut 50, although any suitable equivalent may be utilized for these particular elements.

Each of the five error operators designated by the common numeral 281, is connected via a branch conductor 402, the five branch conductors designated by the common numeral 402 being in turn connected to a trunk line 404 respectively connected to the tape readers 51 and 52. Thus, whenever a particular series of programmed movements is completed, the error operators 281 are operable via the trunk line 404 to provide a signal to whichever of the tape readers 51 or 52 is connected to activate the system. The signal from the trunk line 404 provides a signal to the tape readers for proceeding with the next block of information on whichever of the tapes is connected to effect machine movements, this information then being stored in properly decoded form in the code converter 277 for the next programmed series of machine movements.

In a similar manner, the five servo-amplifiers 292X, Y, Z, S, and T respectively are connected via branch conductors to a common energized line 406. A disconnect switch 407 is selectively movable to closed position in a manner to transmit current from energized input line 409, 410 to the lines 406 and 275 respectively.

As hereinbefore explained, the various elements designated by common numerals in the block diagram, FIG. 11, are operative in similar manner to perform identical functions, although the placement of various of these elements is slightly different in the associated machine structure, depending upon the particular structural component it is associated with, the X axis, Y axis, Z axis, spindle velocity, or table movement. For example, to indicate the exact vertical position of the saddle 26, as shown in FIG. 1, the position indicator or reader 287Y is secured to the saddle 26 in a manner to cooperate with the scale 288Y which is secured to a vertical side face of the column 21. Likewise, as shown in FIG. 1, the position indicating head 287Z is secured directly to the transversely movable spindle head 29 in a manner to cooperate with the horizontally disposed scale 288Z secured to a side face of the saddle 26. As shown in FIGS. 1, 2 and 5, the position indicating reading head 287T is secured directly to the rotatable index table 53 in a manner to cooperate with a circular position indicating scale 288T that is secured to the central portion of the machine frame 18.

It will likewise be apparent that the power translator 294T associated with the index table 53, is constituted by a gear drive, instead of a screw and nut mechanism as shown for the X, Y and Z axes. Further, the power translator 294S associated with the drive for the spindle 34 is constituted by interconnected gears and the speed transmission 38. Inasmuch as the spindle 34 is controlled only for speed rate, no positioning feedback control is necessary, and none is shown in FIG. 11. The indexable table 53, on the other hand, requires only a point to point positioning control from the position indicating head 287T via the feedback line 283T to the error operator 281T. In the embodiment of the invention shown, no velocity control is necessary for the worktable 53 as it is advanced from selected index position to the next required position.

As a prerequisite to effecting numerically controlled indexable movement of the table 53, it is necessary that the table be first elevated to a disengaged position. To accomplish this, the tape signal for indexing is preceded by an unclamp signal fed into the code converter 277, and thence transmitted via the trunk line 279 to energize a relay coil 414, as shown in FIG. 11. The relay coil 414 is interconnected between the common signal supply conductor 279 and the energized line 406. Upon energization of the relay 414 in response to the appropriate input signal, the normally closed contact bars, as shown in FIG. 10 thereof are moved to open position. Inasmuch as the normally closed contact bars are interconnected in series between the solenoid 195 connected to energized conductor 417 and a conductor 418 connected to energized conductor 419, movement of the contact bars to open position effects de-energization of the solenoid 195.

Thereupon, as shown in FIG. 9, the valve spool 187 associated with table clamp valve 185 is biased leftwardly connecting the main pressure supply line 183 to the upper ends of cylinders 164 and 165 to effect upward movement of the table 53 to disengaged position. As this occurs, the lower support plate 163 engages the actuating plunger of limit switch 173, urging a normally open contact bar into closed position, as shown in FIG. 11. Upon closure of the switch 173, the indexing control circuit from supply conductor 279 is completed by movement of the associated switch contact bar to closed position and to the branch supply conductor 280T in a manner to transmit the appropriate index movement signal to the error operator 281T. In response to the index signal, the drive motor 151 is energized to effect a requisite rotational movement of the table 53 to its next selected index position.

Upon the arrival of the table 53 in selected position, a positioning feedback signal from the reading head 287T is transmitted via feedback conductor 283T to the error operator 281T. Likewise, inasmuch as the table has completed its movement to the selected index position, the relay coil 414 is de-energized to effect return movement of the contact bars, FIG. 10, to their normally closed position, thus re-establishing an energized circuit from conductor 419 to energize the solenoid 195. Energization of solenoid 195, as hereinbefore explained, effects rightward movement of valve spool 187, FIG. 9, to reconnect the main pressure supply line 183 to the hydraulic line 191 for effecting downward movement of the table 53 into properly clamped position upon the supporting frame 18. It will be apparent that the table 53 can be repetitively advanced to different indexed positions in coordinated relationship with other required movements of the major movable members in response to program input information. Thus, for example, the table 53 may be selectively indexed to each of four different index stations, in each of which a different program of machining operations may be automatically performed upon the particular face of the workpiece that is positioned in operative relationship relative to the main tool spindle, 34, as shown in FIG. 1. By means of interspersing different degrees of indexing movement, in predetermined relationship to other machine movements, it will be apparent that an extremely wide variety of machining operations may be performed upon any workpiece that is advanced into the operating station by either the work supporting pallet 54 or 55.

Whenever the machine is operating to perform a program of machining operations in response to either the tape reader, 51 or 52, signals are transmitted from the tape to the code converter 277 which is then operative to de-energize a relay 422 and energize a relay coil 423, as shown in FIG. 11. Both of the relay coils 422 and 423 are interconnected between conductors emanating from the code converter 277 and conductors connected to the energized line 406. As soon as a particular program of machining operations is initiated, relay 423 is energized to effect movement of normally closed contact bars associated therewith, FIG. 10, to open position. At the same time, de-energization of the relay coil 422 effects movement of normally open contact bars associated therewith to open position. Conversely, at the completion of a particular program of machining operations, signals are transmitted to the code converter 277 which is then operative to effect energization of relay 422, relay 423 being retained in energized condition. Thereupon, the contact bars associated with relay 422, FIG. 10, are moved to closed position to condition the control circuit for a subsequent machine program.

For connecting the required tape reader, 51 or 52, to control machine movements there is provided a latching type relay 425, FIGS. 10 and 11, that is operative to effect simultaneous movement of normally open contact bars 426L and normally closed contact bars 426U. As shown in FIG. 11, the normally closed contact bars 426U are operative to complete a circuit from the tape reader 52 to the input conductor 276. At the same time, the normally open contact bars 426L are in open position to preclude transmission of an operating signal from tape reader 51 to the conductor 276.

To provide the operating conditions illustrated in FIG. 11, it will be assumed that the work supporting pallet 54 has been advanced into the operating station for the next program of machining operations requiring connection of the tape reader 52. Concomitantly with advancement of pallet 54 into the operating station, the unlatching coil 427, FIG. 10, is energized to return the contact bars 426L to open position and the contact bars 426U to normally closed position. As the work pallet is then clamped to the surface of the worktable 53, FIG. 9, in response to downward movement of the clamp actuating rod 214, a pressure switch 430 is actuated to effect closure of the normally open contact bars associated with the switch 430, FIG. 11. As soon as the contact bars of the pressure switch 430 are moved to closed position, an operating circuit is completed from the energized input conductor 276 to activate the code converter 277, FIG. 11. Thus, actuation of the pressure switch 430 effects a final operative connection which permits automatic starting of the tape reader 52 for activating the code converter 277 to initiate the next program of machining operations required by a workpiece carried by the work supporting pallet 54. At the same time, coils 422 and 423 are activated to control movement of the associated contact bars, FIG. 10, as hereinbefore explained.

In a similar manner, whenever the pallet 54 is moved into the unloading station and pallet 55 is moved into the operating station, the latching coil 426 associated with relay 425 is energized to open contact bars 426U and close the contact bars 426L, thereby establishing an operative connection from tape reader 51 to the input conductor 276. Upon subsequent movement of the pallet 55 into clamped engagement upon the work supporting table 53, the pressure switch 430 is again actuated to effect closure of the associated contact bars to connect conductor 276 for activating the code converter 277, thereby initiating the next program of machining operations upon a workpiece carried by pallet 55.

The control circuit diagrammatically illustrated in FIG. 10 is operative to effect alternative advancement of a work supporting pallet, 54 or 55, into the machine operating station, and simultaneously therewith, effect an operative connection of one or another of the tape readers, 51 or 52, to initiate the next required program of machining operations. The arrangement is such that separate single push button controls are respectively operative to effect a required shuttle transfer movement of one or another of the pallets, with all subsequent movement of the shuttle bar, clamping of the work pallet, and initiation of the appropriate tape reader controlled program of machining operations proceeding sequentially and automatically in response to the single push button control. Likewise, at the start of a particular program of machining operations, one or another of indicator lights 448 or 449 is energized to signal the operator that a program of machining operations upon a workpiece in the operation has been completed, and the circuit can be conditioned for advancing the next uncompleted workpiece into the operating station for a different machining program. Thus, it will be apparent that machining operations may be performed in relatively continuous fashion upon workpieces alternatively advanced into the operating station, with a minimum of time being required between programs upon the alternately presented workpieces. Therefore, for all practical purposes, it can be said that the machine tool spindle is relatively continuously operable since unloading of a completed workpiece and loading of an uncompleted workpiece is accomplished in one of the unloading stations 57 or 58.

The machine control system is so arranged that, at the start of a working day, a selected one of the pallets, 54 or 55, may be advanced into the working station to begin a series of machining operations upon a selected workpiece. At the completion of work on the previous day, it is contemplated that whichever of the pallets remains in the operating station may be manually moved to its associated unloading station. Manual movement of an unloaded pallet from the operating station to an unloading station would mean that both of the pallets 54, 55 are in the unloading stations 58, 57 respectively at the start of the next working day. Thus, the starting shuttle movement, after both pallets have been loaded with the required workpieces, provides for moving only one of the pallets into the operating station. For example, referring to FIG. 1, it will now be assumed that pallet 54 has been moved manually to the unloading station 58, and pallet 55 is in the unloading station 57. The next shuttle movement then would provide for moving the pallet 54 from unloading station 58 into the operating station 59, with pallet 55 being retained in unloading station 57 as shown in FIG. 1. All subsequent shuttle movements, after the single starting movement, provide for simultaneous advancement of both pallets 54, 55 in coordinated relationship with activation of the associated numerical control system, as hereinbefore explained.

To accomplish this, as shown in the circuit diagram FIG. 10, there are provided three separate push button switches 434, 435 and 436 respectively. Whenever both of the pallets are in unloading stations, momentarily depressing push button switch 434 conditions the circuit for advancing the single pallet 54 into the operating station. With the circuit conditioned for advancing pallet 54 into the operating station 59, momentarily depressing the cycle start switch 436 effects the initial, single shuttle movement of pallet 54, with pallet 55 being retained in its unloading station. After the machine has been started, as described, depressing the push button switch 435 effects a simultaneous shuttle movement of both pallets, pallet 54 being moved into unloading station 58 and pallet 55 being moved into operating station 59. In other words, depressing the cycle start switch 436 to effect a single pallet shuttle movement conditions the circuit for simultaneous shuttle movement of both pallets, the direction of transfer then being determined by depressing either the push button 435 or the push button 436 as required.

Power for energizing the circuit shown in FIG. 10 is derived from a pair of energized line conductors 439, 440 connected via a disconnect switch 441 to energize line conductors 417, 419 respectively. With line conductors 417, 419 energized, switch 434 is momentarily depressed to complete a circuit via a conductor 443, normally closed contact bars 444A of a pallet reverse control relay 444 to energize the coil of a relay 445. Energization of the coil 445 completes a holding circuit from energized conductor 419 via the upper closed contact bars 445B of relay 445 to the conductor 443. At the same time, lower contact bars 445C of energized relay 445 are moved to open position to interrupt a circuit from energized conductor 419 to a conductor 447, thereby de-energizing the shuttle signal light 448. Energization of the relay 445 likewise operates to urge contact bars 445G in closed position, and contact bars 445K in closed position during the particular program cycle being initiated.

To actually start the single shuttle movement, after effecting energization of relay 445, the cycle start switch 436 is momentarily depressed to complete a circuit from energized line 419, normally closed contact bars of the relay 423, and thence via a conductor 451 and through the closed contact bars 445K of energized relay 445 to a conductor 452. From the conductor 452, the circuit continues through contact bars 457 which are moved to closed position by a cam (not shown) operable to indicate movement of the table to its home position; and thence through normally closed contact bars 444K, 453K to energize a relay 454. Energization of relay 454 also effects movement of normally closed contact bars 454N to open position, thus de-energizing high pressure clamping solenoid 238 and low pressure clamping solenoid 228. Simultaneously, another circuit is completed via a branch conductor 455 to energize the pallet unclamping solenoid 243, thus effecting movement of the pallet clamp 66 upwardly to a shuttle transfer position. Energization of the relay 454 effects closure of contact bars 454M to complete a holding circuit from the energized line 419 to a branch conductor 458 connected to the conductor 452 to retain the relay 454 in energized position during the shuttle advancement. Likewise, relay contact bars 454G are moved to closed position to establish a circuit to conductor 456, and thence via closed contact bars 445G to energize a shuttle start relay 460. Energization of the relay 460 likewise effects closure of normally open contact bars 460P for activating the shuttle movement, which then occurs, immediately upon movement of the pallet clamp 66 to upper unclamped position effecting closure of switch 247.

Closure of switch 247 in turn completes a circuit from the energized line 419 through closed contact bars 174P, which are actuated to closed position whenever the table is in clamped engagement upon the support, and thence through switch contact bar 247, closed contact bars 460P and normally closed contact bars 444P to a conductor 459. From the conductor 459, the circuit continues through the normally closed contact bar 147P of reverse switch 147 to effect energization of solenoid 262. As hereinbefore explained with reference to FIG. 9, energization of solenoid 262 effects rightward movement of the rack 124 and transfer bar 72 to effect a rightward movement of the pallet 54 into operating position upon the worktable.

Upon arrival of the pallet 54 in operating position upon the index table, the rightward end of the rack 124 engages the switch 147 to effect a reversal of movement of the transfer bar 72. Activation of switch 147 effects movement of contact bar 147P to open position thus de-energizing the solenoid 262, and likewise effects closure of contact bar 147Q to effect an immediate energization of the shuttle reverse solenoid 269 which is operative to return the bar to extreme leftward parked position. This circuit is completed from energized line 419, closed contact bar 174P, closed switch contact bar 247 to a conductor 461 and a conductor 462. Since switch 148 had been deactuated upon rightward movement of the shuttle 72 from parked position, the circuit continues from energized line 462, closed contact bar 148Q of the deactuated switch 148 to a conductor 463.

Inasmuch as the shuttle reverse switch 147 is activated only momentarily to effect reversal, it will be apparent that the contact bars 147P, 147Q associated therewith are immediately returned to the position indicated in FIG. 10, once reversal has been started. Therefore, to effect continued reverse movement of the bar to parked position, a shunt circuit is immediately established from energized conductors 462 and 463, closed contact bar 444R, and a conductor 465 to a conductor 466 for energizing the relay 444 connected at its opposite terminal to energized conductor 417. Energizing relay 444, in turn, effects movement of normally closed contact bar 444A to open position to interrupt the initial control circuit, thereby effecting de-energization of the relay 445, interrupting the holding circuit through contact bars 445B and permitting movement of contact bars 445C to normally closed position. Indicator light 448 remains de-energized, however, because normally closed contact bars 426C are moved to open position whenever the latch relay is held open. To connect the appropriate tape reader for controlling the machining program, normally open contact bars 444I are moved to closed position thus completing a circuit from energized line 419 to energize the coil 426 of latching relay 425. Relay coil 426 operates to urge normally open contact bars 426F to closed position completing a circuit to energize signal light 449. Energization of latching coil 426 effects closure of contact bars 426L, FIG. 11, for connecting tape reader 51 to conductor 276. Likewise, energization of relay 444 effects movement of normally closed contact bars 444P to open position thus, precluding energization of shuttle solenoid 262 upon return movement of contact bar 147P to closed position after reversed movement has been initiated. Likewise, to continue reversal of shuttle bar movement, energization of relay 444 effects closure of normally open contact bars 444R completing a shunt control circuit from conductor 462 through the closed contact bars 444R to conductors 464 and 465, thus retaining solenoid 269 and the relay 444 energized until the transfer bar 72 is returned to its extreme leftward parked position.

Upon arrival of the transfer bar 72 in its extreme leftward position, switch 148 is again actuated to effect movement of contact bar 148Q to upper open position, thus interrupting the circuit to solenoid 269 and relay 444 which are then de-energized; the upper normally open contact bar 148N associated with reverse shuttle switch 148 is urged into closed position completing a circuit from energized conductor 419 to a conductor 468.

During this initial single shuttle movement, the right transfer bar 88 is retained in extreme rightward parked position to maintain the switch 145 actuated. Therefore, the circuit continues from conductor 468 via closed contact bar 145N to a conductor 469, and thence via normally closed contact bars 454N, through the normally closed contact bar of deactuated switch 248 to a conductor 471 connected to effect energization of the low pressure pallet clamping solenoid 228. As soon as the pallet clamp 66 and pallet 54 are urged downwardly under low clamping pressure in response to energization of solenoid 228, as hereinbefore explained, switch 248 is actuated to upper closed position, thus effecting energization of the high pressure pallet clamping solenoid 238.

Upon movement of contact bars 444I to closed position upon energization of relay 444, a circuit is completed from the energized conductor 419 to energize the latching coil 426 of the latching relay 425, to effect movement of contact bars 426U, FIG. 11, to open position and closure of contact bars 426L for connecting tape reader 51 to conductor 276. Upon full pressure clamping of the pallet 54 to the worktable, pressure switch 430 is actuated to effect closure of the normally open contact bars associated therewith to closed position thus activating the code converter 277 for initiating a program of machining operations.

After the initial, single shuttle movement has been completed, the machine is conditioned for automatic operation, at the completion of each machining program, in accordance with the particular pallet that is in the operating station upon the worktable. For example, with pallet 54 in operative position upon the worktable, push button switch 435 is operative to effect a simultaneous shuttle movement of the pallet 54 to the unloading station and the pallet 55 into operating station. This is due to the fact that the contact bars associated with tape completed relay 422 are moved to energized closed position upon the completion of a particular program of machining operations. Inasmuch as the control circuit for effecting a leftward shuttle movement of pallet 54 and pallet 55 is generally similar to that for effecting rightward movement of the pallet, it is not deemed necessary to describe in detail the complete operation of the control circuit for effecting a leftward shuttle movement. However, it may be advantageous to explain the operation of the shuttle initiating switches 434 and 435 after the cycle start switch 436 has been depressed to initiate the single pallet shuttle movement at the start of a day.

It will now be assumed that a machining program has been completed upon a workpiece carried by the pallet 54, and the code converter 277 operative to effect energization of the tape completed relay 422, thereby effecting closure of the associated contact bars in line K, FIG. 10. This condition existing, with an uncompleted workpiece loaded on the pallet 55, push button 435 is momentarily depressed to complete a circuit from energized line 419 to energize the relay 473 having its opposite terminal connected to the energized line 417. Conversely, in the event push button 435 is depressed during a machine program to condition the circuit for transfer, shuttle movement takes place automatically at the completion of the program upon closure of contact bars 422, line K.

Energization of the relay 473 effects closure of normally open contact bars 473E associated therewith and movement of normally closed contact bars 473F to open position. Closure of contact bars 473E completes a holding circuit via the normally closed contact bars 453D to retain the relay 473 in energized condition. Likewise, energization of the relay 473 effects closure of normally open contact bars 473L to complete a circuit for energizing the shuttle start relay 454. This circuit is completed from energized conductor 419, via closed contact bars of energized relay 422, conductor 451, closed contact bars 473L, to the conductor 452. From the conductor 452 the circuit continues as hereinbefore explained to energize the relay 454 and, simultaneously therewith, effect energization of the pallet unclamping solenoid 243. Simultaneously with the energization of pallet unclamping solenoid 243, normally closed contact bars 454N are moved to open position to interrupt the circuit to the pallet clamp solenoids 228, 238.

Upon arrival of the pallet clamp 66 in upper unclamped position, switch 247 is actuated to closed position, completing a circuit from energized conductor 419 via the closed contact bars 174P to the conductor 461. As this condition is being established, energization of relay 454 effects closure of contact bars 454G to complete an energized circuit to conductor 475, which continues via closed contact bars 426H and closed contact bars of energized relay coil 426 and thence through closed contact bars 473H of energized relay 473 to energize a shuttle start relay 477. Thereupon, contact bars 477S are moved to closed position, completing a circuit from energized conductor 461, and thence via closed contact bar 453S through the normally closed contact bar 142S of reverse switch 142 to energize the left shuttle solenoid 253. Upon leftward movement of the associated shuttle bar, switch 145 is deactuated, permitting movement of contact bar 145T to move to closed position. Upon arrival of the pallet 55 in operative relationship above the work-table 53, reverse switch 142 is momentarily actuated to move contact bar 142S upwardly to de-energize solenoid 253. At the same time, lower contact bar 142T is momentarily closed to complete a circuit from closed contact bar 145T through closed contact bar 142T to conductors 478 and 479, for energizing reverse shuttle solenoid 258 and control relay 453. Energization of relay 453 effects movement of normally closed contact bar 453S to open position to prevent the re-energization of shuttle solenoid 253; and, closure of contact bars 453U for establishing a holding circuit to conductors 478, 479 and relay 453 until return rightward movement of the shuttle bar is completed.

Upon arrival of the shuttle bar 88 in its extreme rightward parked position switch 145 is again actuated, causing contact bar 145T to be moved to open position thus effecting de-energization of solenoid 258 and relay 453. Actuation of switch 145 likewise effects closure of the contact bar 145N to re-establish a circuit from energized conductor 419 to effect sequential energization of the low pressure pallet clamping solenoid 228 and 238 as hereinbefore explained.

Whenever the pallet 55 is moved into operating position upon the worktable 53, tape reader 52 is operatively connected to conductor 276, FIG. 11. This is accomplished upon energization of relay 453 which effects closure of contact bars 453J completing a circuit from conductor 419 to energize the unlatching coil 427 of relay 425, which effects return movement of normally closed contact bars 426U to the position illustrated in FIG. 11. As hereinbefore explained with reference to shuttle movement of pallet 54 into the operating station, clamping of the pallet 55 in like manner effects actuation of pressure actuated switch 430 to effect closure of the associated contact bars completing a circuit from conductor 276 to activate the code converter 277 for effecting the next program of machining operations.

In a modified form of the invention, a tool change mechanism is operatively associated with the machine tool spindle, and is adapted to remove a tool carried by the spindle, replacing it with a different selected tool according to the requirements of a particular program of machining operations. The tool change mechanism is similar in general function and mode of operation to the tool change mechanism fully disclosed and claimed in United States Patent No. 3,052,011, issued to Wallace E. Brainard, John A. Hansen, Robert K. Sedgwick, Charles B. Sipek and Hans J. Baechle, and entitled, "Machine Tool With A Mechanical Cutting Tool Changer." In the present invention, the structural arrangement and general principles of operation of the tool change mechanism are fully illustrated in simplified form in FIGS. 12, 13, 14 and 15, the latter illustrating the operative interconnection of the tool change mechanism in the numerical control system which is alternatively operative in conjunction with the shuttle mechanism. Inasmuch as the present invention is not directed to the tool change mechanism per se, a greatly simplified electro-hydraulic control system is shown. This control, FIGS. 13 and 14, is operative to effect a sequential operation of the tool change mechanism which is illustrated as being capable of all essential movements in accordance with the principles fully described in the aforementioned U.S. Patent 3,052,011.

As shown in FIG. 12, a modified form of spindle head 29M is slidably carried by the vertically movable saddle 26 for selective movement relative thereto along the Z axis. A rotatable tool spindle 34M is thus carried for selective movement along three mutually perpendicular planes relative to the indexable worktable 53, FIG. 1. As shown in FIG. 12, a selectively indexable tool storage drum 502 is rotatably supported by the spindle head 29M. The tool storage drum 502 is provided with a plurality of pivotably mounted tool holders or sockets 503, which are respectively shown in FIG. 12 as carrying a plurality of different types of cutting tools. To facilitate the description, the tools carried by the storage drum are identified by the reference numerals T54 and T55 respectively, i.e. all tools to be used upon the workpiece carried by the pallet 54 carrying the common numeral 54 and all tools associated with the workpiece carried by the pallet 55 carrying that common numeral. Prior to effecting an actual tool change, the storage drum 502 is selectively indexed to position the next required tool, in this case T54A, adjacent a tool change station. Next, in predetermined coordinated relationship with the machining program then in progress, the tool change mechanism 504A is selectively activated to effect the required tool change. At the start of the tool change movement, the tool T54A as well as the mechanism 504A is pivoted from a phantom line position, shown in FIG. 12, outwardly to the actual tool change positions shown in full line in FIG. 12. As this occurs, the tool T54A is aligned in axial parallelism with the tool T54B then carried by the tool spindle. To effect the actual tool change movement, the mechanism 504A is provided with a tool change arm 504 that is carried for both pivotable and axial movement about a horizontal axis. At the completion of a required tool change movement, the cutting tool T54B shown as being carried by the spindle 34M in FIG. 12, will be transferred to the pivotable tool storage holder 503, and the tool T54A will be transferred into an operating position in the tool spindle 34M in position for the next machining operation. Likewise, at the completion of a tool changing movement, the tool holder 503 and tool change mechanism 504A are pivotably returned to parked position in a manner that the drum 502 may be indexably rotated to properly position the next required tool adjacent the tool change station. All tools are retained in releasable collet holders of uniform diameter that are in turn releasably retained in an associated tool storage socket 503 by a detent (not shown). To simplify the description, reference numerals identify a tool and an associated collet holder.

The actual mode of operation and structural arrangement of the parts required for effecting a tool change cycle is illustrated in schematic form in FIG. 13. The various movable parts there shown are likewise presented in coordinated relationship with the necessary power actuators and hydraulic circuit for effecting the complete required sequence of movements constituting a tool change.

As shown in FIG. 13, the tool storage drum 502 is journalled to rotate about a horizontally disposed shaft 508 secured to the spindle head 29M. A ring gear 509 carried within the tool storage drum 502 is engaged by a pinion 510 secured to a shaft 512 driven by reversible motor 513. Energization of the motor 513 thus operates to effect a selective indexable movement of the tool storage drum 502 for positioning one or another of the tools carried thereby adjacent the tool change station. To effect final positioning of the tool storage drum 502, as well as retain it in a selected index position, there is provided an axially movable tapered index plunger 515 secured to a piston 516 constrained for slidable movement within a hydraulic cylinder 517. As shown in FIG. 13, hydraulic fluid admitted via the line 518 is operative to urge the piston 516 inwardly to retain the plunger 515 in engagement with an index notch 519, the particular engaged position shown being adapted to retain the tubular storage socket 503 in proper position for a tool change movement.

After the tool storage drum 502 is moved to a selected position, initiation of a tool change cycle first causes the tool holder 503 and the tool change mechanism 504A to pivot outwardly 90° to properly align the tool holder 503 in parallelism with the tool spindle 34M.

Pressure fluid for activating the plunger piston 516 is derived from a sump 521, being withdrawn by a pump 522 connected to be driven by a motor 523 that is connected in well known manner to be energized by an electric circuit (not shown). From the pump 522, the flow of pressure fluid continues to a main pressure line 524 constituting a source of hydraulic pressure fluid for all of the solenoid controlled valves shown in FIG. 13. With the index plunger 515 engaged, the valve 528 is actuated as shown, the valve spool 529 being urged leftwardly by a compression spring 530. With this condition existing, fluid under pressure is transmitted from the supply line 524 via a cannelure formed in the valve spool 529 to the line 518 connected to effect inward movement of the piston 516. At the same time, pressure fluid is exhausted from the opposite inner end of the cylinder by a return line 531 connected by a valve spool groove to a main exhaust line 532 connected to return fluid to the sump 521. Prior to effecting a selected index movement of the tool storage drum 502, it is necessary to energize a solenoid 533 effecting rightward movement of the valve spool 529 in opposition to the spring 530. Upon rightward movement of the valve spool 529, the pressure supply line 524 is connected via a valve spool groove 535 to the line 531 thus effecting outward movement of the piston 516 to withdraw the index plunger 515 from engagement with one or another of the notches 519. Upon outward movement of the piston 516, pressure fluid is then exhausted via the line 518, connected by a valve spool groove 536 to the main exhaust line 532.

Upon the admission of hydraulic pressure fluid from line 545 to the cylinder 546, a piston 547 is urged leftwardly to effect corresponding leftward movement of piston rod 548, provided on its inner side with rack teeth (not shown). Leftward movement of the piston rod rack 548 effects clockwise rotation of a cooperatively meshing rotatable pinion 549 connected to effect simultaneous rightward movement of an axially slidable rack 550. Since the tool holder 503 is pivotably supported by a radially extending arm 551 carried by the tool storage drum 502, the tool holder is pivoted outwardly to the position shown in FIG. 13 upon rightward movement of the rack 550.

Clockwise rotation of pinion 549, upon leftward movement of piston 547, effects a corresponding clockwise rotation of shaft 552 and a pinion 553. The upper pinion 553 engages a gear segment 554 provided with a laterally extending arm 555 that is pivotably secured to a lever arm 556. At its opposite end the lever arm 556 is secured to a pivot pin 559 extending upwardly from a main tubular support 560. Thus, clockwise rotation of pinion 553 effects counterclockwise rotation of segment 554 which, in turn, operates to urge lever arm 556 leftwardly to rotate the entire tubular support 560 outwardly 90°. The tubular support 560 is rotatably journalled at its opposite ends about concentric axes by coacting portions of the spindle head 29M.

The action of the reciprocable racks 548, 550 in effecting pivotable movement of the toool storage socket 503 may be better illustrated by reference to tool holder 503A, FIG. 13, which is shown in its normal parked position, i.e. with the tool axis parallel to the axis of the shaft 508. As there indicated, each of the tool holders, such as 503A, is provided on its periphery with cams 561 and 562 respectively. The rearward cam 561 is engaged by the rightwardly moving rack 550 to effect outward pivotable movement of the tool storage socket 503; and, the forward cam 562 is engaged upon rightward movement of the piston rod rack 548, whenever the tool is returned to its storage position. At the completion of an outward pivotable movement of the tool change arm support 560 and tool storage socket 503, fluid is exhausted from the opposite end of the cylinder 546 via a return line 565 connected by a valve spool groove to the main exhaust line 532. To simplify the description, all necessary movements accompanying a tool change will be described in the sequence in which they occur.

Upon arrival of the tool change arm in outward position, an abutment 565 secured to the arm 556 actuates a normally open switch 566 to initiate the next movement. Energization of the switch 566 operates to effect energization of a pair of solenoids 568 and 569 respectively associated with control valves 570 and 571 respectively. Energization of solenoid 569 effects rightward movement of a valve spool 573, thereby connecting the main pressure supply line 524 via a valve spool groove 574 to a supply line 575 connected at its opposite end to supply pressure fluid to a cylinder 576. With pressure fluid admitted within cylinder 576, a slidable hollow piston 577 is retained in downward position within the cooperating cylinder. At the same time, energization of solenoid 568 effects rightward movement of valve spool 581 to connect the main pressure supply line 524 via a valve spool groove 582 to a supply line 583.

A regulating valve 584 in the line 583 is operative to reduce the pressure through the line which is connected to a port formed in the lower end of the wall for the enlarged cylinder 576. With pressure from line 575 admitted to the upper end of the cylinder 576, however, the piston 577 is retained in its downward position in opposition to reduced pressure flow via line 583. Pressure fluid from line 583, however, continues through a port formed in the lower wall 585 of the hollow piston 577 and flows into the lower end of an inner cylinder 586 formed within the piston 577. As this happens, pressure fluid introduced in the lower end of cylinder 586 urges a piston 589 upwardly to its limit of movement in the cooperating cylinder 586. Upward movement of the piston 589 displaces fluid via a line 590 which is connected by a groove 591 formed in a valve spool 592 of a valve 593 to a main exhaust line 532.

Upward movement of piston 589 effects corresponding upward movement of a piston rod 595 and a rack 596. Upward movement of the rack 596 effects rotation of an intermeshing pinion 597 in a clockwise direction, effecting like rotation of a spline shaft 598 secured thereto and a sequence control cam 599. The spline shaft 598 engages an internally splined tubular sleeve 602 that is journalled to rotate within a horizontally disposed cylindrical opening provided in a forward extension 603 integrally formed with the rotatable tubular support member 560. At its forward end, the internally splined sleeve 602 is secured to the central portion of the tool change arm 504. Initial rotation of the tool change arm 504, in a clockwise direction, in response to movement of piston 589 is arranged to be sufficient to effect an operative engagement of the tool change arm with tool holders T54A and T54B respectively carried by the tool storage socket 503 and the tool spindle 34M. The original positions in which the tool holders T54A and T54B are positioned at the time they are respectively engaged by 90° movement of the tool change arm 505, are indicated in FIG. 12.

To support each tool, both during withdrawal and a subsequent tool change movement, the tool change arm 504 is provided at its opposite ends with circular openings 506 and 507 that are open, in opposite directions, to effect engagement with the tool holders for the tools T54A and T54B respectively. For retaining the tool holder tightly during a change movement, each of the openings is provided with a spring biased roller detent 608 as indicated in FIG. 13. The detent 608 is disposed to move radially with respect to the axis of the tool supported within the circular opening 506. In a similar manner, the circular opening 507 formed at the opposite end of the tool change arm 504 is likewise provided with a spring biased detent (not shown).

Only two of the complete sequence of events required in a tool change are shown in FIG. 13. The tool change arm 504 is shown in a vertical, parked or zero (0°) position. Next, in phantom lines, the arm is represented in its outer position, after a 270° rotation to position the tools for reinsertion.

Intermediate the parked position indicated in FIG. 13 and the phantom line position, two additional movements are required. During the original 90° of clockwise rotational movement of the tool arm 504, the actuating roller of a normally open switch 612 is engaged by a dwell portion 613 of the control cam 599 which is rotating in a clockwise direction. Upon arrival of the cam 599 and tool arm 504 in the 90° position, the actuating roller of switch 612 is engaged by the enlarged periphery or land 614 of the cam 599. Actuation of switch 612 to closed position upon arrival of the arm 504 in the 90° position, in turn, operates to effect unclamping movement of a clamp mechanism 617 and forward movement of the tool change arm 504. The clamp mechanism 617 is provided with a horizontal slot, and a tapered forward end 618 disposed to coact with a complementary taper presented within the forward end of the tool spindle 34M. Thus, upon forward movement of the clamp mechanism, a tool is unclamped from engagement with the tool spindle 34M. Conversely, upon being urged rearwardly, the tapered forward shoulder 618 is engaged by the complementary spindle taper in a manner to urge the mechanism into clamping engagement, in well known manner, with a tool that is positioned therein. To effect selective operation of the clamp mechanism 617, there is provided a hydraulic cylinder 619. A piston 621 slidably constrained for movement within the cylinder 619 is secured to the rearward end of a piston rod 622 integrally formed with the clamp mechanism 617, and is normally urged rearwardly by a compression spring 623 to effect clamping operation. To release the clamp mechanism, the hydraulic supply line 624 is connected to supply fluid under pressure to the rearward end of the cylinder 619, thus urging the piston 621 forwardly in opposition to the clamp spring 623.

As the piston 621 is urged forwardly to release the clamp mechanism, a dog 626 carried at the rearward end of the piston rod 622 is moved forwardly to deactuate a normally closed switch 627.

Thus, after the tool support arm 504 is rotated rightwardly 90° to effect initial engagement with the respective tool holders, switch 612 is actuated by the cam surface 614 to effect sequential unclamping of the mechanism 617, and after this has been done, forward movement of the tool support arm 504 to withdraw the respective tools from their associated supports. Actuation of switch 612 to closed position operates to effect energization of a solenoid 629 associated with a clamp control valve 630. Thereupon, valve spool 631 is urged rightwardly connecting the main pressure supply line 524 via a groove 632 to the supply line 624.

Leftward movement of the piston 621, in response to pressure fluid from supply line 624, effects deactuation of switch 627, which operates to energize a solenoid 636 associated with a control valve 637. Energization of solenoid 636 effects leftward movement of a valve spool 638 to provide for a transmission of pressure fluid from supply line 524 via a valve spool groove 639 to a supply line 640.

From the supply line 640, pressure fluid is transmitted into the rearward end of a cylinder 644 formed in the lateral extension 603, thereby urging a piston 645 and piston rod 646 outwardly. The piston rod 646 is provided with an arm 647 engaging an annular groove presented by the internally splined sleeve 602. Outward movement of the piston 645 operates to effect corresponding outward movement of the tool change arm 504, in its 90° position, to effect withdrawal of the tool holders from the tool spindle 34M and the tool change socket 503. As outward movement takes place, hydraulic fluid is exhausted from the forward end of the cylinder 644 via a line 647A connected by a valve spool groove 648 of the leftwardly displaced valve spool 638 to the main exhaust line 532.

Upon arrival of the tool change arm 504 in its forward 90° position, a lateral abutment integrally formed with the piston rod 646 actuates a switch 651 to effect the required 180° rotation of the tool change arm 504 to its phantom line position, shown in FIG. 13 (which is actually displaced 270° from the vertical zero (0°) degree position).

Actuation of switch 651 operates to effect de-energization of solenoid 569 and its associated spool 575 returns to leftwardly biased position in response to a compression spring 653. Thereby, the outer cylinder 576 is connected by the line 575 and a valve spool groove 654 to the main exhaust line 532. Inasmuch as solenoid 568 is retained in energized condition, as this occurs, pressure fluid from supply line 583 effects bodily upward movement of the outer hollow piston 577. Thus with the inner piston 589 moved to its upward limit, and the outer piston 577 moved to its upper limit within the cylinder 576, the tool change arm 504 is rotated an additional 180° to position the tools for insertion into the tool spindle and storage socket respectively.

The control cam 599 is likewise rotated an additional 180° to the 270° position during which the actuating plunger of switch 612 is retained in actuated condition by the elongated cam land 614 which extends for approximately 270°. Likewise, concomitantly with the arrival of the tool change arm 504 in the 270° position, a laterally extending cam lobe or land 655 presented by the cam 599 is rotated to the 270° position in a manner to actuate a switch plunger associated with a control switch 656. It will be apparent that the tool T54A originally carried by the tool storage drum, FIG. 12, has now been displaced 180° and is adapted to be moved inwardly for insertion in the unclamped spindle 34M. Likewise, the tool T54B originally carried by the tool spindle 34M has been displaced 180° in the opposite direction for insertion into the empty tool storage socket 503.

With this condition having been established, actuation of switch 656 operates to effect de-energization of the solenoid 636 and energization of a solenoid 659. Energization of the solenoid 659 effects rightward movement of the valve spool 638 to the position shown in FIG. 13, thereby connecting the main pressure supply line 524 to the outer end of cylinder 644 urging the piston 645 and tool change arm 504 to their extreme inward positions. As this occurs, the tool T54A is inserted into the released clamp mechanism 617, and the tool T54B is inserted into the storage socket 503. The tool T54B is retained within the storage socket 503 by means of a resiliently biased detent (not shown).

Upon arrival of the tool change arm 504 in its extreme inward, 270° position, the lateral dog presented by piston rod 646 actuates a control switch 660. Actuation of switch 660, in turn, operates to effect reclamping of the clamp mechanism 617 for retaining the next required tool, in this case T54A, in operative engagement in the tool spindle 34M. To accomplish this, solenoid 629 associated with valve 630 is de-energized, permitting resiliently biased leftward movement of the valve spool 631. Clamp cylinder 619 is then connected via hydraulic line 624 and the valve spool groove 642 to a line 661 connected to the main exhaust line 532. Thereupon, the spring 623, associated with clamp cylinder 619, urges the piston 621 rearwardly to actuate the mechanism 617 for clamping the tool in operative relationship in the tool spindle 34M. At the same time, the tool change arm 504 is rotated in a counterclockwise direction from the inward 270° position. After being disengaged from the respective tools, the arm is urged outwardly to clear the tools as it continues to be rotated in a counterclockwise direction to its zero (0°) degree, outward position. During return movement, control valve 664 operates to retard counterclockwise rotation of the tool change arm 504, permitting disengagement of the arm from the tool holders. After a predetermined timed interval during counterclockwise movement, the "in" solenoid 659 is de-energized and the "out" solenoid 636 is energized to effect outward movement of the piston 645, thus permitting the arm to clear the tools as it continues to rotate to its 0° "out" position. To accomplish this, actuation of the switch 660 operates to effect de-energization of solenoid 568 associated with valve spool 581 which is resiliently urged to the leftward position illustrated in FIG. 13. Thus, both the inner cylinder 586 and the outer cylinder 576 are connected at their lower ends to exhaust via the line 583, which is then connected via valve spool groove 663 and through a predeterminately adjusted control valve 664 to the main exhaust line 532.

Simultaneously with the de-energization of solenoid 568, the solenoid 569 is energized to transmit pressure fluid from the main supply line 524 via the groove 574 and line 575 to the upper end of cylinder 576 to urge the outer hollow piston 577 downwardly. At the same time, a solenoid 666 is energized to effect rightward displacement of a valve spool 667 carried by the return control valve. Rightward movement of the valve spool 667 connects the main pressure supply line via a valve spool groove 669 connected via line 590 to an inlet port formed in the central portion of the wall for cylinder 576. Upon arrival of the outer hollow piston 577 in downward position, an inlet port formed in the upper wall of cylinder 586 is aligned with a central port in cylinder 576, permitting admission of pressure fluid via the line 590 into the cylinder 586. Pressure admitted into cylinder 586 in turn urges the piston 589 to its extreme downward position.

With both the outer hollow piston 577 and inner piston 589 returned to extreme downward position, the rack 596 is returned to the position indicated in FIG. 13, in which the tool change arm 504 is in its outwardly displaced zero degree position. Likewise, the control cam 599 is rotatably returned to the position indicated in which the cam land 655 presented thereby actuates a switch 675.

The tool change arm 504 is next returned to its inward, zero degree position, after which both the entire tool change mechanism 504A and tool storage socket 503 are returned to their parked position. To accomplish this, actuation of home switch 675 operates to de-energize solenoid 636 and energize solenoid 659, and simultaneously therewith, a time delay relay 703, which in turn effects de-energization of solenoid 539 and energization of a solenoid 676. After the solenoid 659 operates to move arm 504 to its inward 0° position, energization of the solenoid 676 associated with control valve 540 effects leftward movement of the valve spool to connect the main pressure supply line 524 via a valve spool groove 677 to the hydraulic line 565. Pressure fluid from line 565 urges piston 547 outwardly to effect corresponding movement of the piston rod rack 548, returning the tool change socket 503 to parked position, and rotating pinion 549 in a counterclockwise direction. Counterclockwise direction of lower pinion 549 effects simultaneous clockwise rotation of gear segment 554, which then operates to urge lever arm 556 rightwardly, thus pivoting the tool change support 560 to its parked position. Return movement of the tool change socket 503 and tool support 560 to parked position, causes movement of lever arm abutment 565 to actuate a switch 580 which is operative to provide a signal for indicating the required tool change has been completed. Subsequently the next required series of programmed machining operations is resumed, during which the tool storage drum is indexably moved to position the next required tool adjacent the tool change station.

The complete electrical control circuit for effecting the single tool change cycle, i.e. a transfer of the next selected tool from the tool storage drum into the tool spindle, is illustrated in FIG. 14. As there shown, normally open contact bars 681 are urged into closed position, upon an appropriate signal from the program tape, to complete a circuit from the energized conductor 419 to energize a tool start relay 682 connected at its opposite terminal to the energized line 417. Thereupon, a holding circuit is established from energized conductor 419 via closed contact bar 682B to retain the relay 682 in energized condition during an actual tool change cycle.

For effecting initial movement of a tool storage socket and tool change mechanism from parked position, contact bars 682C are moved to closed position completing another circuit from conductor 419 via normally closed contact bars 685C to energize solenoid 539 which is connected at its opposite terminal to conductor 417. Upon arrival of the tool change mechanism in outer, operating position, switch 566 is urged to closed position completing a circuit along line D, and thence by normally closed contact bars 687D to energize the solenoid 568. At the same time a parallel circuit is completed via a line 688, and normally closed contact bar 691E to energize the solenoid 569. As hereinbefore explained, energization of solenoids 568 and 569 operate to rotate the tool change arm 504 90° in a clockwise direction to effect initial engagement with the respective tool holder.

Upon arrival at the 90° position, normally open switch 612 is actuated to closed position by engagement with cam land 614, FIG. 13, to complete a circuit from conductor 419 and normally closed contact bars 687F to energize the unclamping solenoid 629. Another circuit is then completed via a parallel line 692, through normally closed contact bars 693G, and thence through the closed contact bar of collet unclamped switch 627 to energize the tool withdrawal solenoid 636. Outer movement of the tool change arm 504 effects actuation of switch 651 to closed position completing a circuit via normally closed contact bars 687I to energize a control relay 691, a holding circuit being established via closed contact bars 691J. Energization of relay 691 effects movement of normally closed contact bars 691E to open position, thus de-energizing solenoid 569 to permit an additional 180° of rotational movement of the tool change arm 504 to the phantom line position indicated in FIG. 13. With the tool change arm 504 in the 270° position, for reinsertion of the tools, cam land 655 actuates switch 656 to closed position completing a circuit along the line K via normally closed contact bars 685K to energize the relay 693 establishing a holding circuit via closed contact bars 693L. Energization of relay 693 effects movement of normally closed contact 693G to open position, thus effecting de-energization of the tool arm out solenoid 636. Simultaneously therewith, a parallel circuit is established via conductors 696 and 697 to energize the solenoid 659 for reinserting the tools in the spindle and storage socket respectively.

Actuation of the 270° position indicating switch 656 to closed position effects simultaneous closure of the lower contact bar 656N to connect energized line 419 to a conductor 698. Therefore, as soon as the next tool holder has been inserted in the tool spindle in response to energization of conductor 697, switch 660 is actuated to closed position completing a circuit via normally closed contact bars 684N to effect energization of control relay 687. Upon energization of relay 687, a holding circuit is then established via closed contact bars 687P; and, normally closed contact bars 687D are moved to open position to interrupt the circuit to solenoid 568. Upon de-energization of solenoid 568, FIG. 13, cylinders 576 and 586 are connected via the line 583 and the throttle control valve 584, as well as the throttle control valve 664 to retard movement of the pistons to their extreme downward position. Energization of relay 687 likewise effects closure of contacts 687E completing a circuit to re-energize solenoid 569 thereby connecting hydraulic line 575 to transmit pressure fluid to the upper end of cylinder 576. As this occurs, to effect movement of the tool change arm 504 from engagement with the respective tool holders, a parallel circuit is established via a line 702 to energize a time delay relay 703.

A predetermined interval after the arm is disengaged from the tool holders (midway between the 270° and 90° positions), time delay relay 703 effects closure of contact bars 703H and 703P. As this occurs, a circuit is completed from energized conductor 419 via closed contact bar 703H, normally closed contact bars 685H to re-energize the solenoid 636, thereby effecting outward movement of the tool change arm 504, to clear the tools as it continues to rotate in a counterclockwise direction. Simultaneously, closure of contact bars 703P effects energization of solenoid 666 to connect the main pressure line to hydraulic line 590, FIG. 13; pressure fluid from conduit 590, in turn, effects downward movement of inner piston 589. Upon arrival of the arm 504 in its zero degree outward position, switch 675 is moved to closed position, as indicated in FIG. 14. As this occurs, a circuit is completed from energized line 419 via the closed contact bar of switch 675, the closed contact bar 687Q of energized relay 687, to energize the relay 685, the opposite terminal which is connected to energize conductor 417. As this occurs, a holding circuit is completed from conductor 419 via closed contact bars 685R of the energized relay 685. Energization of relay 685 effects movement of normally closed contact bar 685H to open position, thereby effecting de-energization of solenoid 636, permitting movement of the tool change arm 504 to its inward zero degree position. Likewise, 685M is closed to re-energize solenoid 659 for moving the tool change arm 504 to its inner 0° position. As this happens, another normally open contact bar 660R associated with switch 660 is moved to closed position to complete a circuit to solenoid 676 for effecting transmission of fluid under pressure from a supply line 524 via a cannelure 677 to move the piston 547 outwardly. As hereinbefore explained, outward movement of piston 547 effects simultaneous movement of the tool storage socket 503 and tool change mechanism support 560 to their parked positions. Upon arrival of the support 560 in parked position, switch 580, FIGS. 13 and 14, is actuated to complete a circuit from conductor 419 via a normally closed contact bar 682R to momentarily energize the tool change completed relay 684.

Whenever the modified form of the invention comprising the tool change mechanism schematically shown in FIG. 13, is utilized in conjunction with the shuttle mechanism, it will be apparent that control tapes provided with the required additional coded information will be respectively inserted in the tumble-boxes for the tape readers 51 and 52, FIG. 11. As hereinbefore explained, the coded information on such tapes provides for programming selected ones of the tools T54, FIG. 12, whenever the shuttle 54 is in the operating station. Likewise, whenever the shuttle 55 is in the operating station, selected ones of the tools T55 are sequentially inserted into the tool spindle 34M, in accordance with programmed input information and related machine movements.

To accomplish this, the tape readers 51 or 52 are selectively connected to the conductor 276, FIG. 11, which is then connected upon closure of pressure switch 430 to the code converter 277. As shown in FIG. 15, the code converter 277 provides the necessary input information to trunk line 279 and a conductor 279D. Whenever the signal from the code converter 277 provides for selectively indexing the tool storage drum 502, a relay 709 having its opposite terminal connected to energized line 406 is energized to effect closure of associated contact bars 709, line T in FIG. 14. Thereupon, an energized circuit is completed to energize solenoid 533, shown in FIGS. 13 and 14, to effect rightward movement of valve spool 529 and retraction of index plunger 515. As this occurs, normally open switch 710 is moved to closed position, completing a circuit to conductor 280D, FIG. 15, which is connected to error operator 281D, and thence to the servo-amplifier 292D. The amplifier 292D, in turn, is operative to effect selective actuation of the motor 513 to effect the required indexable movement of tool storage drum 502.

During indexable movement of the tool storage drum 502, relay 709 likewise effects movement of normally closed contact bars 709U, FIG. 15, to preclude initiation of a tool change cycle. At the completion of the required indexing movement of the tool storage drum 502, the reading head 287D associated with a cooperating circular scale 288D provides a feedback signal via conductor 282D, indicating that the required indexable movement has taken place. As soon as this happens, relay 709 is de-energized to effect inward movement of the latching plunger and return movement of contact bar associated with switch 710 to open position. Closure of contact bar 709U then conditions the circuit for the next required tool change, as soon as all of the other machine movements have been completed for use with the tool then carried by the tool spindle.

The next tool change cycle is then effected upon the requisite signal from code converter 277 via the conductor 279D connected to effect energization of relay 681, connected at its opposite terminal to energized line 406. Energization of relay 681 effects closure of the associated normally open contact bars, line A in FIG. 14, to effect energization of tool change start relay 682. In response to energization of relay 682, the tool change cycle then is automatically effected as hereinbefore explained in conjunction with the detailed explanation of FIGS. 13 and 14. At the completion of the required tool change cycle, initiated by closure of contact bars 681, switch 580 in line S is moved to closed position to energize the tool change completed relay 684. Energization of relay 684 is only momentary, effecting movement of normally closed contact bar 684N to open position, de-energizing relay 687. At the same time, momentary energization of relay 684, effects momentary closure of normally open contact bar 684D, FIG. 15, to complete a tool change completed circuit from code converter 277, via a conductor 715 to the return feedback trunk line 404.

From the foregoing detailed explanation of the operation of the shuttle operated tape controlled machine tool herein set forth as a practical embodiment of the present invention, it will appear that there has been provided a greatly improved automatic machine tool in which tool change selection, tool change operation, and coordinated movement of machine tool slides to effect machining operations is completely automatic in response to the required programmed input information. Likewise, a plurality of different machining operations may be performed in any predetermined sequence upon workpieces of different dimension and configuration alternately advanced to the single machine tool working station.

Although the illustrative embodiments of the invention have been described in considerable detail for the purpose of fully disclosing a practical operative structure by means of which the invention may be practiced, it is to be understood that the particular apparatus and control system herein described are intended to be illustrative only, and that the various novel characteristics of the invention may be incorporated in other structural forms without departing from the spirit and scope of the invention as defined in the subjoined claims.

The principles of this invention having now been fully explained in connection with the foregoing description, we hereby claim as our invention:

1. In a machine tool;
  a power driven tool support and a work support respectively carried for movement in coordinated relationship to each other;
  power driven motion translators respectively operative to move said supports;
  indicators connected to be activated by said supports and being operative to supply information as to the velocity and position of said supports;
  a numerical control system responsive to coded input information and being operative in response thereto to activate said translators for effecting a predetermined program of machining movements of said supports;
  feedback control means operative to correct said indicators to said motion translators for modifying the operation of said numerical control system;
  a plurality of controllers respectively adapted to provide coded input information activating said numerical control system for effecting a sequential program of machine movements;
  a switching mechanism actuatable to connect a selected one of said controllers for actuating said numerical control system to operate said machine through a predetermined program of machine movements;
  a plurality of work carrying pallets respectively positionable upon said work support;
  a transfer mechanism including moving means and guide means operatively associated with said work support;

power operable means connected to actuate said transfer mechanism for moving one of said pallets into an operative position upon said work support and to move another of said pallets from said work support to an unloading station; and, selectively operable control means connected to activate said power operable means and said switching mechanism for moving a selected pallet into position upon said work support and simultaneously therewith connecting an appropriate one of said controllers to activate said numerical control system for effecting a predetermined machining program of machine movements.

2. In a machine tool;

a working station;

a pair of transfer ways adjacent said working station;

a pair of loading and unloading stations associated with said transfer ways;

a pair of work carrying pallets respectively carried in said working station and one of said unloading stations;

a releasable clamp mechanism in said working station;

a selectively reciprocable power driven transfer mechanism carried for longitudinal movement in operative relationship to said transfer ways, said transfer mechanism being selectively actuatable to transfer one of said pallets from said working station to an unloading station and the other of said pallets to said working station, said transfer mechanism being reversibly reciprocable;

means for actuating said clamp mechanism into fixedly clamped engagement with the one of said pallets moved into said working station upon the completion of a transfer movement;

a power driven tool support carried for bodily movement relative to whichever of said pallets is clamped in said working station;

a power driven translating mechanism connected to effect selective bodily movement of said tool support;

a plurality of numerical control systems respectively connectable to actuate said power driven translating mechanism for effecting bodily movement of said tool support through a predetermined same or different sequence of machine movements;

switching means operative to disconnect one of said numerical control systems from said translating mechanism and simultaneously connect the other of said control systems to actuate said translating mechanism;

an indicating mechanism operatively connected to be actuated by movement of said tool support;

feedback control means interconnected between said indicating means and whichever of said numerical control systems is connected to actuate said translating mechanism;

means connected to be responsive to whichever of said numerical control systems is connected to actuate said translating mechanism and being operative to actuate said clamp mechanism to a released position upon the completion of a program of tool support movements; and, selector means operative to actuate said transfer mechanism and simultaneously therewith to actuate said switching mechanism for connecting a different one of said numerical control systems to actuate said translating mechanism, whereby said bodily movable tool support is operative to machine workpieces requiring the same or different programs of machining operations.

3. In combination with a machine tool having two groups of relatively movable power driven positioning members and a power driven work support and tool support;

a digital type translating control system operative to effect a predetermined sequence of positioning movements of said members as well as relative machining movements between said tool support and said work support, said translating system being disposed to control the sequence and extent of movement of said members and said supports in response to command information supplied thereto;

a plurality of selectively presettable program control systems including a source of energy and being respectively and individually connectable to said translating mechanism to energize said translating mechanism for operating said machine tool support and work support for performing a preselected program of machining operations;

switching means operative to connect a selected one of said program control systems individually to said translating mechanism for energizing said translating control system to operate said machine supports throughout a program corresponding to the requirements of a particular workpiece carried by said work support;

a transfer mechanism operatively disposed to remove a workpiece from said work support at the completion of a program of machining operations effected thereon, said transfer mechanism being simultaneously operative to move a different workpiece into operating position on said work support and to actuate said switching means for operatively connecting a different one of said program control systems to said translating mechanism, said transfer mechanism being reversibly operative at the completion signal from whichever of said program control systems is connected to activate said translating control system;

a reversible power source operative to actuate said transfer mechanism; and, a plurality of power supply circuits operatively interconnected between said source of energy, said program control systems, said switching means, and said power source.

4. In a machine tool having a tool support and a cooperating work support carried for relative bodily movement in mutually perpendicular planes, said work support being carried for selective indexable movement;

a power translator connected to effect relative bodily movement between said supports;

a first presettable program control system connectable to said translator to effect a selected predetermined sequence of machine movements including indexable movement of said work support for performing a plurality of machining operations upon a workpiece releasably clamped to said work support;

a second presettable program control system connectable to said translator to effect a different selected predetermined sequence of machine movemens including indexable movement of said work support for performing a different plurality of machining operations on a different workpiece releasably clamped to said work support;

a releasable clamp operatively associated with said work support;

a reciprocable transfer mechanism operatively connected to move one workpiece from a working station on said work support to an unloading station and simultaneously therewith to move a different workpiece into operating position upon said work support at the completion of one program of machining operations, said transfer mechanism being reversibly operative at the completion of each program of machining operations;

actuating means connected to release said clamp for releasing a workpiece carried by said work support and said actuating means being connected to be actuated by the completion of one program, said actuating means being operatively connected to be actuated by completion of a transfer movement in either direction to operate said clamp for securing a different workpiece to said work support; and, switching means responsive to said transfer mechanism to operatively connect one of said program control systems for controlling machine movements in accordance with the particular workpiece that is clamped to said work support.

5. In a machine tool;

a frame;

a tool support and a cooperatively positioned work support carried for relative rectilinear bodily movement by said frame, said work support being rotatably supported for selective indexable movement;

a power driven index control system connected to effect selective indexable movement of said work support;

a plurality of power driven translating mechanisms respectively connected to effect a coordinate relative movement between said supports;

a numerical control system responsive to programmed input information and being operatively connected to actuate said translating mechanisms for effecting a predetermined series of relatively coordinated digital movements of said supports comprising a series of machining cycles for one workpiece, said system being operatively connected to said index control system for effecting coordinated indexable movement of said work support;

a pair of position indicators and a pair of velocity indicators respectively connected to be activated by movement of said supports;

feedback control means interconnecting said position indicating control means and said velocity control means to said numerical control system for modifying the operation of said numerical control system;

a plurality of separate digital controllers including sources of power respectively comprising tape readers together with different associated control tapes adapted to supply separate programs of machine movement information for different workpieces;

a control switch actuatable for connecting a selected one of said controllers to said numerical control system for activating said numerical control system in a manner to effect movements of said supports;

a plurality of pallets adapted to carry different workpieces and being respectively positionable upon said work support;

a shuttle transfer mechanism including pallet moving means and guide means disposed to move a selected one of said pallets into an operative position upon said work support, said shuttle mechanism being simultaneously operative to move a pallet from said work support to one of a plurality of operatively associated unloading stations; and, a start control operatively connected to activate said shuttle transfer mechanism for moving a selected one of said pallets into position upon said work support and simultaneously therewith to actuate said control switch for connecting one of said controllers to initiate an appropriate predetermined program of support movements, whereby said supports are coordinately movable to perform different series of successive cycles of machining operations upon correspondingly different workpieces.

6. In a machine tool having a bodily movable rotatable tool spindle and a cooperatively movable work supporting table;

a plurality of power actuators operable to effect predetermined bodily movements of said tool spindle and said work table;

a selectively indexable tool storage drum carried in proximity to said tool spindle, said drum being provided with a plurality of tool carrying devices;

a tool change mechanism being operative to effect a tool change cycle comprising withdrawing a tool from said spindle and simultaneously withdrawing a preselected tool from said storage drum, said mechanism being next operative to insert into said spindle the said withdrawn tool from said drum and to insert into said storage drum the withdrawn tool from said spindle;

power operable control means selectively actuatable to effect a tool change cycle;

a control system including a removable control tape operatively connected to selectively actuate said power translators for effecting a predetermined program of sequential cycles of machine movements;

another control system including a different removable control tape connectable to selectively actuate said power translators for effecting a predetermined program of sequential cycles of machine movements, each of said control systems being predeterminately operative to activate said power operable control means for effecting tool change cycles in a manner to interchange the same or different series of tools between said spindle and said storage drums in coordinated relationship with machine movements; and, selector means operatively actuatable to connect the second of said control systems to effect one program of machine movements and to disconnect the first of said control systems, whereby said machine is operable to perform a selected different sequential program of machining operations and a different control tape may be substituted for the removable control tape in whichever of the control systems is not connected to actuate said machine.

7. In a machine tool having a bodily movable rotatable tool spindle and a cooperating bodily movable work supporting table;

a tool change mechanism including a plurality of stored tools and being operatively actuatable to remove a tool carried by said spindle and replace a selected one of said stored tools in said spindle;

a plurality of power actuators operable to effect predetermined bodily relative movements of said tool spindle and said worktable;

a control system including a removable control tape connectable to said power actuators to selectively actuate said power actuators for effecting a predetermined program of sequential cycles of machining movements;

another control system including a removable control tape connectable to said power actuators to selectively actuate said power actuators for effecting a different predetermined program of sequential cycles of machining movements, each of said control systems connected to selectively actuate said tool change mechanism for inserting the same or different tools in said rotatable tool spindle in coordinated relationship with effecting control of machining movements;

selector control means operatively actuatable to selectively connect one of said control systems to effect one program of machine movements and simultaneously to disconnect the other of said control systems; and, a plurality of workpiece loading stations including transfer means selectively operable in response to said selector means for moving a selected workpiece into an operating position upon said table, whereby said machine is rendered continuously operable to perform a succession of different preselected programs of machining operations.

8. In a machine tool;

a power driven rotatable tool support and a work support respectively carried for relative rectilinear movement in coordinated relationship to each other;

power driven motion translators respectively operative to move said supports;

indicators connected to be activated by said supports and being operative to supply information as to the velocity and position of said supports;

a power driven tool changing mechanism including a plurality of tools carried in storage position;

cycle control means connected to actuate said tool changing mechanism for interchanging a tool carried by said rotatable tool support with a selected tool from said storage position;

a numerical control system responsive to coded input information operatively connected to activate said translators and being operative in response to input information to activate said translators for effecting a predetermined program of machining movements of said supports and to actuate said cycle control means for operating said tool change mechanism in coordinated relationship with machine movements;

feedback control means operative to connect said indicators for modifying the operation of said numerical control system;

a plurality of controllers respectively provided with different removable control tapes, said controllers being respectively adapted to provide coded input information and being selectively connectable to said numerical control system for effecting a sequential program of machine movements;

a switching mechanism actuatable to connect a selected one of said controllers to said numerical control system for actuating said numerical control system to operate said machine through a predetermined program of machine movements and tool changes;

a plurality of work carrying pallets respectively positionable upon said work support;

a shuttle transfer mechanism including moving means and guide means operatively associated with said work support;

power operable means connected to actuate said shuttle mechanism for moving one of said pallets into an operative position upon said work support and to move another of said pallets from said work support to an unloading station; and, selectively operable control means connected to activate said power operable means and said switching means for moving a selected pallet into position upon said work support and simultaneously therewith connecting an appropriate one of said controllers to said numerical control system for effecting a particular machining program that is appropriate for a workpiece carried by the particular pallet upon said work support.

9. In a machine tool having a single bodily movable rotatable tool spindle and a cooperating bodily movable work supporting table;

a tool change mechanism including a plurality of stored tools and being operatively actuatable to remove a tool carried by said spindle and to insert a selected one of said stored tools in said spindle;

a plurality of power actuators operable to effect predetermined bodily relative movements of said tool spindle and said worktable;

a control system connectable to selectively actuate said power actuators for effecting a predetermined program of sequential cycles of machining movements;

another control system connectable to selectively actuate said power actuators for effecting a different predetermined program of sequential cycles of machining movements;

each of said control systems connected to selectively actuate said tool change mechanism in coordinated relationship with effecting control of machining movements;

selector means operatively actuatable to connect one of said control systems to effect one program of machine movements and simultaneously operative to disconnect the other of said control systems;

shuttle transfer means operative to transfer one completed workpieces from said table and to transfer a different uncompleted workpiece into operative position upon said table; and a reversible power source connected to actuate said transfer means and being connected to be actuated by said selector means.

10. In a machine tool;

a frame;

a tool support and a work support carried by said frame for relative bodily movement in mutually perpendicular planes, said work support being carried for selective indexable movement;

a plurality of power driven translating mechanisms connected to said supports for selective operation to effect relative movement between said supports and selective indexable movement of said work support;

a plurality of presettable program control systems respectively and individually connectable to said translating mechanisms to effect a program of predetermined machining movements of said supports;

switching means operatively actuatable to connect a selected one of said program control systems for effecting a program of relative movements between said supports;

a plurality of transfer ways in spaced relationship on either side of said work support;

a plurality of work carrying pallets slidably carried by said transfer ways in a manner to be respectively movable into an operating position upon said work support;

a power driven transfer mechanism selectively actuatable to transfer one of said pallets from said work support to one unloading station, said transfer mechanism being simultaneously operative to transfer another of said pallets from a different unloading station to an operative position upon said work support, said transfer mechanism being reversibly operative;

a releasable clamp mechanism associated with said work support and being automatically operative to clamp whichever of said pallets is moved into an operating position thereupon, said clamp mechanism being automatically released upon initiation of the next subsequent transfer operation; and, control means operative to actuate said power driven transfer mechanism for effecting the next transfer movement, said control means being operable to actuate said switching means for disconnecting one of said program control systems and connecting another of said program control systems for actuating said translating mechanisms for moving said supports to perform the corresponding program of relative movements between said supports.

11. In combination with a machine tool having a rotatably indexable work support and a cooperatively bodily movable rotatably journaled tool carrying spindle;

means for indexing said work support;

power drive means connected to selectively rotate said tool spindle;

a numerical control system including power translators connected to effect relative bodily movement of said spindle as well as selectively coordinated actuation of said power drive means and said means for indexing;

a tool changer having a plurality of associated tools and being operative in response to said control system to bodily insert a different tool in said spindle;

feedback loops operatively connecting said support as well as said spindle and said tool changer to modify the operation of said numerical control system;

a plurality of readers including a different control tape associated with each reader and being selectively and individually connectable to said numerical control system to supply information for activating said numerical control system; and, switching means selectively operative to singly connect any one selected reader and its associated control tape to said control system, whereby said machine is operative to automatically perform different selected programs of machining movements utilizing the same or different series of cutting tools.

12. In a machine tool having a plurality of relatively movable power driven members including a single work station;
- a selectively actuatable numerical control system including power translators connected to effect a predetermined program of power driven relative movements of said members;
- a plurality of tape reader actuators including different control tapes selectively and individually connectable to said numerical control system;
- selector means for singly connecting any one of said tape reader actuators and its associated control tape to said control system in accordance with the required program of machine movements; and,
- transfer means connected to move a completed workpiece out of said work station and to move a different workpiece into said work station in coordinated relationship with the operation of said selector means.

13. In a machine tool;
a single work station;
tool storage means mounted adjacent to said work station;
a plurality of tools carried by said storage means for placement in said work station to perform machining operations;
tool change means operably connected to replace the tool in said work station with a preselected tool from said storage means;
a plurality of loading stations for receiving workpieces;
transfer means operably connected to transfer workpieces from any of said loading stations to said work station and return;
a record for each of said loading stations with each record containing recorded data representing a specific machining operation to be performed on workpieces placed in its associated loading station and for designating tools in said tool storage means that are required for such machining operation;
a first control circuit for selecting tools from said tool storage means in response to the data on said records and for controlling the operation of said tool change means to replace the tool in said work station with the selected tool from said storage means;
a second control circuit operably connected to regulate the operation of the machine in response to the data on said records for performing the desired machining operations; and,
selection means to select the record provided for the particular loading station from which the workpiece at the work station was received and connect such record for transmitting its data to said control circuits,
whereby the machine will function to automatically perform different machining cycles on different workpieces in response to the data contained on the several records.

14. In a machine tool;
a work station;
a group of tools supported adjacent to said work station with each of said tools being adapted to be placed in operating positions in said work station for performing a work operation;
transfer means operably connected to transfer said tools individually into operating position in said work station and to remove a tool from said work station and return it to said groups of tools;
a plurality of records with each record containing recorded data for automatically controlling the operation of the machine to perform a cycle of machining operations and for designating the tools in said group of tools that are required and their sequence for performing the machining cycle;
a first control circuit operative in response to the data on said records for selecting the tools from said group in their proper sequence as they are to be placed in said work station by said transfer means;
a second control circuit operably connected to regulate the operation of the machine in response to the data on said records for performing the desired machining operations;
selection means operable to select one of said records for transmitting its data to said control circuit; and,
work transfer means coordinately operable with said selector means for removing one workpiece from said work station and moving a different workpiece into said work station,
whereby the machine tool will function to automatically perform different machining cycles on different workpieces in response to the data contained on the several records.

15. In a machine tool for performing different machining operations;
a single work station;
a plurality of loading stations for receiving workpieces;
transfer means operably connected to selectively transfer individual workpieces from one of said loading stations to said work station;
a record for each of said loading stations with each record containing recorded data for automatically controlling the operation of the machine to perform a machining operation on a workpiece transferred from one of said loading stations to said work station;
an electrical control circuit operably connected to regulate the operation of the machine in response to the data received from said records;
transmission means operably connected to transmit the data from said records to said control circuit; and,
selection means operable to connect said transmission means to the particular record provided for the loading station from which the workpiece at the work station was transferred so that the machine will be actuated in the appropriate machining operation for the workpiece at the work station.

16. A metal working apparatus comprising a tool receiving means;
means for operating said receiving means for desired working operations;
work table means including a first work holding means shiftable from an operative position relative to said receiving means to an inoperative position for unloading and loading a workpiece of one type, said work table means including a second work holding means shiftable from said operative position relative to said receiving means to an inoperative position for unloading and loading a workpiece of the same or a different type;
a first record reading means for receiving recorded data to move said receiving means in accordance with a predetermined program;
a second record reading means;
means for selectively connecting one or the other of said record reading means to said means for operating said receiving means for effectuating a predetermined working operation on a workpiece located at said operating position including a control means for actuating said work table shifting means at the termination of said predetermined working operation to shift one of the work holding means to its inoperative position and to bring the other of said work holding means into operative position; and, means actuated by said control means for shifting said record reading selection means to connect the other of said record reading means to said means for operating said receiving means to cause a working operation on a workpiece of the same or different type in accordance with the particular record read by said last mentioned record reading means.

17. In apparatus according to claim 16 including a magazine for receiving a plurality of tools;

a transfer mechanism for removing a tool in said receiving means and placing the same in said magazine and for selecting a particular tool from said magazine and placing the same in said receiving means and actuating means receiving predetermined information read by either one of said reading heads for operating said transfer mechanism one or more times during a predetermined metal working operation in accordance with the metal working desired; and, means included in said control means for connecting said actuating means to the selected reading head.

18. In a machine tool adapted to perform a plurality of operations on different workpieces;

a rotatable tool receiving spindle and a cooperating work support carried for relative bodily movement to perform machining operations;

means for indexing said work support;

first power drive means connected to effect relative bodily movement between said tool spindle and said work support as well as to actuate said means for indexing said work support;

a power actuated tool change member including tool storage means and being selectively operative to interchange tools between said tool spindle and said storage means;

a workpiece loading station carried in operative proximity to said work support;

transfer means operative to move a workpiece from said loading station to said work support;

a plurality of sources of recorded data respectively and individually operative to control the operation of said first power drive means and said tool change member for performing a different program of machining operations on a workpiece moved to said work support from said loading station;

second power drive means connected to actuate and transfer means for moving a workpiece from said loading station to said work support and for removing a completed workpiece from said work support; and, selector control means operatively connected to activate said second power drive means for moving a workpiece from said loading station to said work support and to connect a selected one of said sources of recorded data to operate said first power drive means and said tool change member.

19. In a machine tool having a single working station comprising a tool support and a rotatable work support carried for bodily movement relative to said tool support; means for indexing said work support;

power operable means connected to effect relative bodily movement between said supports and to actuate said means for indexing said work support;

a plurality of tape readers and respectively associated control tapes selectively connectable to activate said power operable means for operating said machine to perform a plurality of predetermined operating movements; and, control means operative to connect one of said readers for activating said power operable means to operate said machine tool and to disconnect a connected one of said plurality of readers therefrom.

20. In a machine adapted to operate on a plurality of different workpieces;

a single work station including tool holding means and a relatively movable indexable work support;

operatively associated loading station;

tool change means including storage means operative to interchange tools with said holding means;

drive means operable to move and index said work support and to operate said tool change means;

transfer means connected to move a workpiece from said loading station to said work station and coordinately therewith to remove a completed workpiece from said work station;

a pair of separate reading means and respectively associated control tapes selectively connectable to operate said drive means to control said machine for performing machining operations on a workpiece carried in said work station; and, selector means connected to actuate said transfer means for moving a workpiece to said work station and to connect a preselected one of said tape readers to control said machine for operating on the workpiece positioned in said single work station.

21. In a machine tool adapted to perform a plurality of machining operations on different workpieces sequentially presented thereto;

a tool support and a relatively movable work support carried for relative bodily movement to comprise a single work station, said work support being indexable;

a power operable means connected to effect relative bodily movement of said support as well as indexable movement of said work support for performing machining operations;

tool change means including tool storage means operative to interchange tools between said tool support and said storage means;

a pair of workpiece loading stations positioned in operative proximity to said single work station;

power operable transfer means operative to move a workpiece from one of said loading stations to said work support and to move a completed workpiece from said work support to the other of said loading stations;

a pair of separate program control systems respectively associated with said loading stations and being individually and separately connectable to activate said power operable control means for performing a predetermined program of machining operations; and, selector control means operably connected to activate said transfer control means for moving a workpiece to an operative position upon said work support and to connect a correspondingly associated one of said program control systems to activate said power operable means to effect relative movement between said support for machining the workpiece carried thereby.

22. In a machine tool operable to perform a plurality of operations on different workpieces;

a working station for securing and operating on a workpiece, said working station including tool holding means and relatively movable indexable work support means;

tool change means including storage means selectively operative to exchange a tool in said holding means with a preselected tool;

a plurality of operatively associated loading stations;

transfer means connected to move a workpiece from one of said loading stations to said working station;

power operable means actuatable to operate said machine;

a program control system associated with each of said loading stations and being respectively connectable to provide a predetermined series of machine commands; and, selector control means connected to actuate said transfer means for moving a workpiece from one of the loading stations to said working station and to connect the program control system associated with that loading station for operating the machine through a machining program and thereafter to move a workpiece from another selected one of said loading stations and to connect its corresponding program control system, whereby the machine tool is sequentially operative to perform machining operations on successively presented workpieces of the same or a different type.

23. In a machine tool adapted to perform a plurality of machining operations on different workpieces;
- a tool spindle and a pallet support carried for relative bodily movement and cooperatively comprising a single working station, said pallet support being indexably movable;
- first power drive means connected to effect relative bodily movement between said tool spindle and said support and selected indexable movement of said support;
- a first loading station and a second loading station positioned in operative proximity to said pallet support;
- a first work supporting pallet positioned in said first loading station and a second work supporting pallet positioned upon said support;
- transfer means connected to advance said second pallet from said support to said second loading station and to move said first pallet to a position upon said support, said transfer means being reversibly operable to return said first pallet from said support to said first loading station and to move said second pallet to a position upon said support;
- power actuatable clamp means connected to releasably clamp a pallet to said support;
- second power drive means connected to effect selective reversible operation of said transfer means;
- a pair of sources of recorded data respectively associated with said loading stations and being respectively operative to activate said first power operable means for moving said supports for performing machining operations on a workpiece carried by one of said pallets upon said support and being from a corresponding loading station;
- circuit means operative to connect a preselected one of said sources of recorded data to operate said first power drive means; and,
- selector control means selectively operative to effect release of said pallet clamp means, to activate said second power drive means for selectively changing the pallets upon said work support, and activate said circuit means for connecting a corresponding source of recorded data for predeterminately controlling said first power drive means.

24. In a machine tool for performing a plurality of machining operations on different workpieces and having spaced apart first and second loading stations;
- a pallet support and relatively movable machining means positioned between said loading stations, said pallet support being indexable and said machining means including tool securing means;
- a pair of pallets respectively positioned in said first loading station and upon said support;
- tool change means including tool storage means operative to interchange a preselected tool with a tool in said tool securing means;
- transfer means operative to move said pallet upon said support to said second loading station and to move said pallet in said first loading station to a position upon said support, said transfer means being reversibly operative to return said pallet on said support to said first loading station and said pallet in said second loading station to a position upon said support respectively;
- pallet clamp means operative to releasably clamp one of said pallets to said support;
- power operable drive means connected to release said pallet clamp and to actuate one of said transfer means for selectively changing the pallet carried by said support; and,
- separate program control means respectively associated with said loading stations and being selectively and individually connected to operate said machine whenever a pallet from said associated loading station is positioned upon said pallet support.

References Cited in the file of this patent

UNITED STATES PATENTS

| | | |
|---|---|---|
| 415,126 | Root | Nov. 12, 1889 |
| 2,341,344 | Graham | May 6, 1941 |
| 2,363,208 | Sulzer | Nov. 21, 1944 |
| 2,611,025 | Jankowski | Sept. 16, 1952 |
| 2,690,913 | Rabinow | Oct. 5, 1954 |
| 2,733,425 | Williams | Jan. 31, 1956 |
| 2,745,167 | Cross | May 15, 1956 |
| 2,748,864 | Ewaldson | June 5, 1956 |
| 2,755,160 | Holmes | July 17, 1956 |
| 2,783,664 | Johnson | Mar. 5, 1957 |
| 2,800,642 | May | July 23, 1957 |
| 2,807,002 | Cherin | Sept. 17, 1957 |
| 2,820,187 | Parsons | Jan. 14, 1958 |
| 2,837,975 | Johnson | June 10, 1958 |
| 2,859,644 | Watts | Nov. 11, 1958 |
| 2,876,650 | Saugster | Mar. 10, 1959 |
| 2,940,384 | Munschauer | June 14, 1960 |

FOREIGN PATENTS

| | | |
|---|---|---|
| 758,135 | Great Britain | Sept. 26, 1956 |
| 1,114,501 | France | Apr. 13, 1956 |

OTHER REFERENCES

Publication, Reprint, parts 1 and 2. Control Engineering, McGraw-Hill Publication, 330 W. 42nd St., New York 36, N.Y. Title 31, Numerically-Controlled Point-to-Point Positioning Systems.

Disclaimer 3,099,873.—*Wallace E. Brainard*, Milwaukee, and *Kenneth R. Merner*, Greendale, Wis. SHUTTLE OPERATED TAPE CONTROLLED MACHINE TOOL. Patent dated Aug. 6, 1963. Disclaimer filed Sept. 24, 1969, by the assignee, *Kearney & Trecker Corporation*.

Hereby enters this disclaimer to all the claims of said patent.

[*Official Gazette November 4, 1969.*]